US007835982B2

(12) United States Patent
Schoen et al.

(10) Patent No.: US 7,835,982 B2
(45) Date of Patent: Nov. 16, 2010

(54) COMPUTER-ASSISTED METHOD AND APPARATUS FOR ABSENTEE SELLERS TO PARTICIPATE IN AUCTIONS AND OTHER SALES

(75) Inventors: Bob Samuel Schoen, Atlanta, GA (US); Tom Kemp Davis, Atlanta, GA (US); Gordon Murray Warren, Alpharetta, GA (US); Joe Luppino, Alpharetta, GA (US)

(73) Assignee: Manheim Investments, Inc., Las Vegas, NV (US)

( * ) Notice: Subject to any disclaimer, the term of this patent is extended or adjusted under 35 U.S.C. 154(b) by 1561 days.

(21) Appl. No.: 10/882,658

(22) Filed: Jul. 2, 2004

(65) Prior Publication Data
US 2006/0004646 A1 Jan. 5, 2006

(51) Int. Cl.
*G06Q 40/00* (2006.01)
(52) U.S. Cl. .................................. 705/38; 705/14.71
(58) Field of Classification Search .............. 705/14.38, 705/14.65, 14.71, 16, 26–27, 35, 37, 80; 716/12–14; 348/150
See application file for complete search history.

(56) References Cited
U.S. PATENT DOCUMENTS

| 4,789,928 | A |   | 12/1988 | Fujisaki |
| 5,774,873 | A |   | 6/1998 | Berent et al. |
| 5,794,207 | A | * | 8/1998 | Walker et al. ............... 705/1 |
| 5,803,500 | A |   | 9/1998 | Mossberg |
| 6,006,201 | A |   | 12/1999 | Berent et al. |
| 6,161,099 | A |   | 12/2000 | Harrington et al. |
| 6,202,051 | B1 |   | 3/2001 | Woolston |
| 6,266,651 | B1 |   | 7/2001 | Woolston |
| 6,415,269 | B1 |   | 7/2002 | Dinwoodie |
| 6,449,601 | B1 |   | 9/2002 | Friedland et al. |
| 6,665,649 | B1 |   | 12/2003 | Megiddo |
| 6,704,716 | B1 | * | 3/2004 | Force ......................... 705/80 |
| 2001/0029455 | A1 | * | 10/2001 | Chin et al. .................. 704/277 |

(Continued)

FOREIGN PATENT DOCUMENTS

CA        2 329 278        2/2001

(Continued)

OTHER PUBLICATIONS

Alan Elliott, Internet Auctions, John Wiley & Sons, 2000, p. 11.*

(Continued)

*Primary Examiner*—Mary Cheung
(74) *Attorney, Agent, or Firm*—Nixon & Vanderhye PC

(57) ABSTRACT

A live auction or other sales transaction permits sellers to dynamically participate from remote locations. The remotely-located seller receives a simulcast of the auction in progress and is able to at any time indicate to the auctioneer an approval to sell an item on the block at the current high bid price. The remote seller may also send a counteroffer to the current high bidder, "if" the sale or reject the high bid to result in a no sale. The computer system detects when the remote seller is temporarily inactive to allow the auctioneer to proceed as if the seller were not present. The remote seller feature can be used on sales with remote buyers, sales with all buyers located at the same location as the goods being offered, or a combination.

15 Claims, 25 Drawing Sheets

U.S. PATENT DOCUMENTS

| | | | |
|---|---|---|---|
| 2001/0029478 A1 | 10/2001 | Laster et al. | |
| 2001/0034697 A1* | 10/2001 | Kaen | 705/37 |
| 2001/0037281 A1 | 11/2001 | French et al. | |
| 2001/0044751 A1 | 11/2001 | Pugliese, III et al. | |
| 2002/0032634 A1 | 3/2002 | Abrams et al. | |
| 2002/0062276 A1 | 5/2002 | Krueger et al. | |
| 2002/0073158 A1* | 6/2002 | Dalal et al. | 709/206 |
| 2002/0082978 A1 | 6/2002 | Ghouri et al. | |
| 2002/0116320 A1* | 8/2002 | Nassiri | 705/37 |
| 2002/0123959 A1 | 9/2002 | Mozley et al. | |
| 2002/0143646 A1 | 10/2002 | Boyden et al. | |
| 2002/0174060 A1* | 11/2002 | Friedland et al. | 705/37 |
| 2003/0036964 A1 | 2/2003 | Boyden et al. | |
| 2003/0055662 A1 | 3/2003 | Collins | |
| 2003/0130966 A1 | 7/2003 | Thompson et al. | |
| 2003/0158804 A1 | 8/2003 | Francis et al. | |
| 2003/0195839 A1 | 10/2003 | Dinwoodie | |
| 2004/0039677 A1* | 2/2004 | Mura et al. | 705/37 |
| 2004/0107160 A1 | 6/2004 | Goclowski | |
| 2005/0021444 A1 | 1/2005 | Bauer et al. | |
| 2005/0228736 A1* | 10/2005 | Norman et al. | 705/37 |

FOREIGN PATENT DOCUMENTS

| | | |
|---|---|---|
| CA | 2 326 346 | 5/2002 |
| GB | 2382162 A | 5/2003 |
| JP | 2003-296610 | 10/2003 |
| JP | 2003296610 | 10/2003 |
| WO | WO0034899 A1 | 6/2000 |
| WO | WO 03065149 A2 | 8/2003 |

OTHER PUBLICATIONS

National Auto Auction Association, Chapter 5—Selling and Auto at Acution, http://www.naaa.com/i4a/pages/index.cfm?pageID=3387, retrieved Nov. 29, 2007.*

Arlene Sawers, Manheim Simulcasts auctions on the Internet, Automotive News, Apr. 21, 2003, vol. 77, Issue 6034, p. 30.*

Cox Enterprises 2003 Annual Report, p. 11, retrieved Nov. 27, 2007 from http://www.coxenterprises.com/corp/aboutcox/annual_reports.htm?Vermenu=comp_overview&Hormenu=annual_reports.*

Van't Haaf, Corey, Business in Vancouver, "It's hammer time for price-savvy buyers, B.C.'s online auctions attract buyers worldwide and offer big surprises at biddings end," Heffel.com News (Jul. 2001).

AutoTradeCenter,Inc., Industry Articles, "AutoRemarketing, Software, New Technologies: Felt in Almost All Areas of Remarketing" (Nov. 14, 2003).

Bidspotter.com-Discover Live Internet Auctions, "Participating in a BidSpotter.com Live Internet Auction Broadcast is safe, easy, and fun! BidSpotter.com has created the most comphrehensive offering for buyers and sellers available today!".

Manheim Simulcast.

Manheim News, "eLane Puts More Dealers 'In the Lanes'", vol. 9 No. 2 (Mar. 2003).

Manheim News, "First Gold Room Opens for MAFS Dealers", vol. 9 No. 4 (May 2003).

Manheim News, "Special Sale Drives in Dealers, Strong Market Values, Georgia Dealers Delivers Innovative Solution", vol. 9 No. 6 (Jul. 2003).

Manheim News, "Take Advantage of Training Available Via Manheim", vol. 9 No. 8 (Sep./Oct. 2003).

"Consigners Sell Remotely With OnLine RingRep", AutoRemarketing.com (Jun. 14, 2004).

Online Ringman Trademark record from Tess.

Online Ringrep Trademark record from TESS.

Manheim Simulcast 3.0 Simulcast Schedule (accessed Jun. 23, 2004).

* cited by examiner

Example Remote Seller Auction

EXAMPLE SIMULCAST ARCHITECTURE

EXAMPLE SIMULCAST DATA FLOW

Example Screen Display Format

Fig. 7

Fig. 12A
EXAMPLE BLOCK CLIENT SCREEN

Fig. 12B
EXAMPLE BLOCK CLIENT SCREEN

Fig. 12C
EXAMPLE BLOCK CLIENT SCREEN

COMPUTER-ASSISTED METHOD AND APPARATUS FOR ABSENTEE SELLERS TO PARTICIPATE IN AUCTIONS AND OTHER SALES

CROSS-REFERENCES TO RELATED APPLICATIONS

Not applicable.

STATEMENT REGARDING FEDERALLY SPONSORED RESEARCH OR DEVELOPMENT

Not applicable.

FIELD

The technology herein relates to electronic commerce, and more particularly to computer-assisted techniques for selling and/or auctioning goods and/or services. Still more particularly, the technology herein relates to computer-assisted method and apparatus for allowing the seller of particular goods including but not limited to motor vehicles to fully participate in an auction or other sale from a remote location via a data communications or other network.

BACKGROUND AND SUMMARY

The Internet and other types of telecommunications means have revolutionized the way auctions and other types of sales are conducted. For example, no longer is it necessary for all auction participants to gather together in the same auction house, auction tent or other physical location. Some auctions continue to be conducted live at an auction site, but the telephone, television, the Internet, or other communications means allows some degree of remote participation. Some auctions are now televised, with potential buyers being invited to submit bids by telephone. Other auctions, such as those operated by ebay, take place entirely within "cyberspace"—with a computer fulfilling some of the functions of an auctioneer by keeping track of bids and bidders, declaring who is the highest bidder, declaring when the auction is over, etc. Such "cyberspace" auctions offer a worldwide clientele, with bidders from a variety of geographical locations participating via the Internet and conventional Internet browsers.

Multimedia data communications capabilities have now in some cases replaced the telephone and television to provide a live auction simulcast to remote bidders. In such auctions, the auctioneer may be a person standing in front of the goods or services to be auctioned off. Just as in a conventional live auction, the auction may be attended by bidders who appear in person to inspect the goods, submit their bids and better their bids during the live auction. However, it is now becoming increasingly common for other bidders to participate in the auction from remote locations. For example, Internet connections may now provide the same effect as closed-circuit television but with the added advantage of two-way interactivity. An Internet bidder can view an audio/video feed using a browser and conventional plug-in—and see and hear everything going on during the auction. To submit a bid, the remote bidder can depress a button or other control displayed in a browser view—sending a signal back to the auction location that is displayed on the auctioneer's display screen. The auctioneer is able to recognize remote bids virtually instantaneously in competition with local bids.

The ability of remote bidders from virtually anywhere to participate in the auction is advantageous for the bidders, the sellers and the auctioneer. The remote bidders benefit because they do not need to travel long distances to physically appear at the auction. The sellers benefit because they have the potential for a much greater number of participating bidders—which often results in merchandise being auctioned at a price that is closer to fair market value. The auctioneer benefits because increased participation potential usually means higher sales volumes and therefore increased revenues.

Many types of auction sales do not require a lot of seller participation. In one type of classic auction situation, the seller may set a reserve price which is the minimum price the seller will allow the item to sell for. Sometimes this reserve price is known only by the auctioneer and the seller, and is kept hidden from bidders or other potential buyers. In this type of auctioning transaction, once the seller sets a reserve price in advance, his participation is generally not needed to complete the transaction. If the seller's pre-specified reserve price is not met, then the item is not sold. On the other hand, if a bid exceeds the seller's pre-specified reserve price, then the auction proceeds and is completed by the auctioneer without the seller's active participation. The auctioneer can simply inform the seller at the conclusion of the sale of details concerning the highest bid.

There are, however, certain types of auctions where direct involvement by the seller or his agent is helpful or desirable. In one example auction of this type, the auctioneer puts the item to be auctioned on the "block" and begins accepting bids. However, it is understood by all participants that the seller must give his or her approval before the auction can be completed. The sale completes only if the seller approves of the final price. This means that the seller must nod or otherwise indicate the bid is acceptable before the auctioneer can declare the highest bidder to have won the auction. This type of dynamic interaction with the seller allows the seller to make reserve price decisions on the spot—providing great flexibility. Even in auctions with a reserve price, if the seller is able to participate and watch the bidding going forward, he may change his mind about the reserve price and allow the goods or services to be sold for less than the reserve—so interactive seller participation may be desirable.

Experience has shown that bidders who do not get immediate feedback as to whether their bids will be accepted will rapidly lose interest. Bidders usually want to know right away if their bid has been accepted. They may be looking for certain types of items, and may wish to bid on other similar items if their high bid on one auction is not accepted. The idea of waiting hours or days for a seller to approve a bid does not comport with these type of auction experiences.

In the past, the need for instantaneous seller approval has generally required sellers to attend auctions in person. This requirement has, however, imposed significant burdens on sellers. In cases where sellers participate in a number of different auctions across a wide geographical region, the need for sellers to travel to each individual auction can be expensive and time consuming—requiring a significant personnel force. While many people in the past have allowed remote bidders to participate in live auctions, allowing sellers to participate remotely is a different challenge.

The technology herein attempts to solve these problems by providing an effective interactive remote seller capability that allows remote sellers to participate in auctions and other sales as if they were physically present at the auction.

One aspect of the exemplary illustrative non-limiting implementation herein provides an absentee seller function allowing sellers to approve the sale of items remotely. In one illustrative, exemplary non-limiting arrangement, sellers have the ability to "approve", "if sale", "no sale" or propose a counter offer for each item they represent in the auction or other sale. The absentee seller function can be employed in sales where all bidders are physically present on site, all bidders are remote, or some bidders are physically present and other are remote.

In an exemplary non-limiting illustrative implementation, the remote ("absentee") seller connects to the auction/sale via the Internet or other data communications means. In one example illustrative implementation, the remote seller uses a conventional Internet browser with appropriate multimedia plug-ins, provided by an appropriate appliance including but not limited to for example a personal computer, a cellular telephone, a personal digital assistant or any other suitable device including input means and display means. A computer system controls the remote seller's device to display various information about the ongoing auction/sale including for example bid history, condition/description of the item being auctioned, value indicators (e.g., fair market value, floor or other fair market price, book value, etc.). Such informative displays may in some cases give remote sellers more complete, comprehensive and readily available information than if they were standing at the live auction.

In one example illustrative non-limiting implementation, the remote seller is also provided with a "simulcast" of the ongoing auction including a live video/audio feed. This way, the remote seller can see and hear what is going on at the auction/sale including for example the ability to observe the auctioneer and the bidders who are physically present. In one exemplary illustrative non-limiting implementation, the remote seller is also able to see bid history information including bids submitted by bidders physically present at the auction/sale as well as bids submitted by bidders who are remotely located and are accessing the auction/sale via the Internet or other telecommunications means.

In one illustrative exemplary non-limiting implementation, the remote seller is provided with a messaging capability allowing the remote seller to pass virtually instantaneous messages to the auctioneer and/or to the other participants. One significant exemplary illustrative type of message the remote seller can pass to the auctioneer relates to the remote seller's approval of the transaction. For example, in certain types of auctions/sales, the transaction is not finalized unless and until the seller approves. In such instances, the remote seller in the exemplary illustrative non-limiting implementation may send a message to the auctioneer (by depressing an "OK to sell" button) informing the auctioneer that the item can be sold at the current high bid price. This seller approval gives the auctioneer freedom to make the auction sale final—either to the current highest bidder or to an additional higher bid that beats the current high bid.

In additional exemplary illustrative non-limiting implementations, the remote seller can provide feedback other than simply accepting or not accepting the current high bid. For example, the seller can "if" a sale—meaning that the sale is made contingent on the seller's later approval. Alternatively, the seller can present the highest bidder with a counter offer (e.g., you have offered $22,000 for this item—if you increase your offer by $500 I will accept your offer and sell the item to you at that price"). Other example feedback includes marketing and other messages that the remote seller can present to all participating bidders (e.g., by displaying them on a billboard or other type interactive display, simultaneously transmitting them to all participating bidders via telecommunications means) and/or asking the auctioneer to report to all.

The illustrative non-limiting exemplary implementation disclosed herein also provides a "temporarily-inactive" feature that remote sellers can take advantage of if they need to leave the auction/sale for a short time but intend to return. Instead of logging out of the auction/sale, the remote seller may simply stop providing feedback to the auctioneer. For example, this may happen if the remote seller receives a phone call, loses his Internet connection or is otherwise distracted from participating in the auction/sale. In this instance, the auctioneer proceeds as if the seller is not present (e.g., by not waiting for the seller to respond and by "ifing" sales in appropriate cases). When the remote seller returns, the remote seller may send a message informing the auctioneer that he or she has returned (e.g., "rejoined the auction"). The auctioneer is informed of the remote seller's return to participating in the auction/sale, and may then again begin relying on the remote seller to provide feedback needed to complete sales.

BRIEF DESCRIPTION OF THE DRAWINGS

These and other features and advantages will be better and more completely understood by referring to the following detailed description of exemplary illustrative non-limiting implementations in conjunction with the drawings of which:

FIG. 7 shows an exemplary illustrative non-limiting remote auction monitor screen with "bid history" display selected;

FIGS. 12a-12c show illustrative non-limiting exemplary block client (auction site administration) display screens.

DETAILED DESCRIPTION

Figure 1:
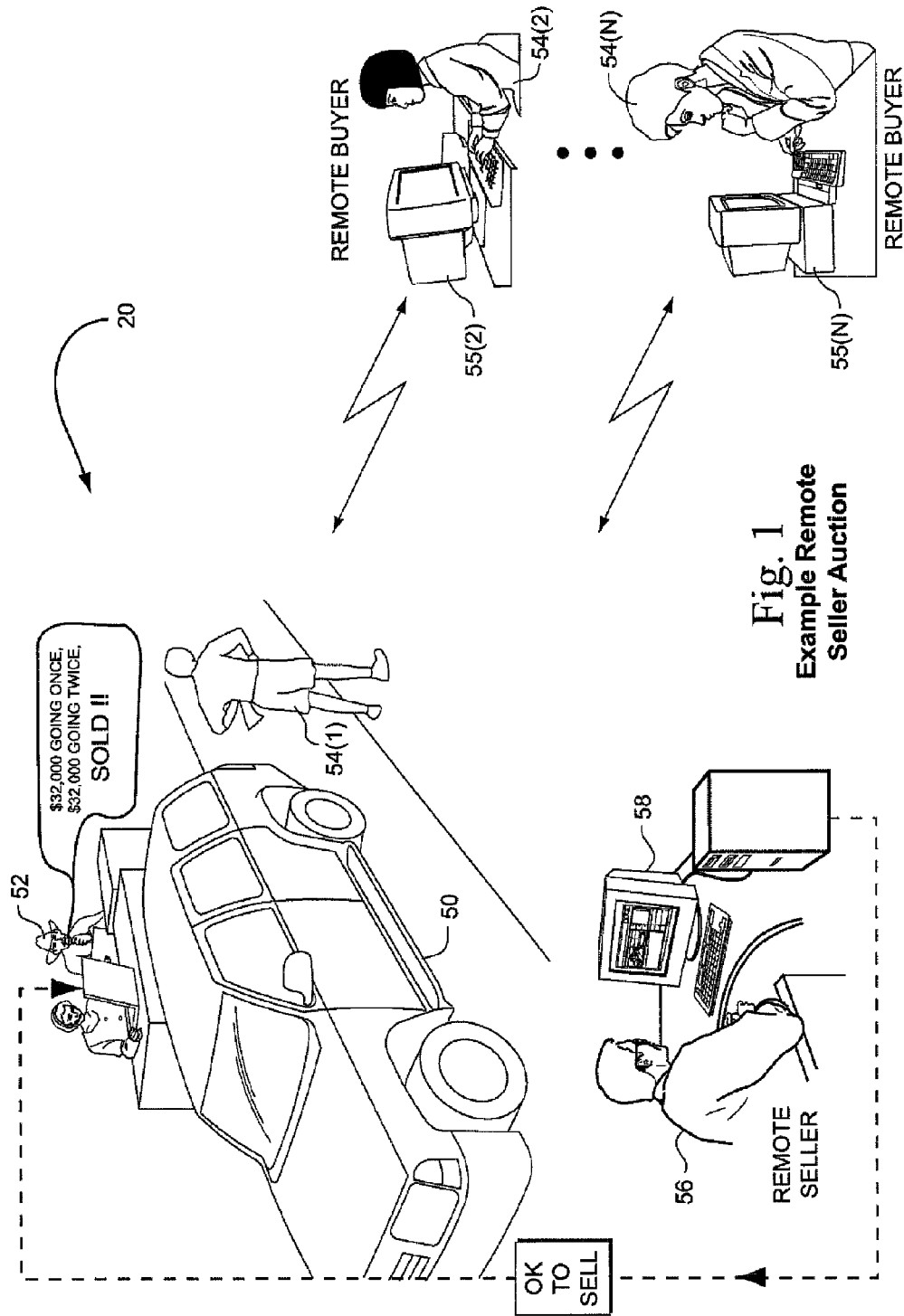
FIG. 1 is a schematic diagram of an overall exemplary illustrative non-limiting auction/sale implementation.

FIG. 1 shows an example overall illustrative non-limiting implementation of an auction/sale transaction system 20. In the example shown, an item 50 to be auctioned or sold is placed on the auction "block" for viewing and inspection by potential bidders. In the example shown, item 50 is a motor vehicle such as a car, but any sort of item could be exhibited for sale. Example items 50 include car, boats, motorcycles, real estate, art works, jewelry, collectibles, furniture, new or used industrial equipment, horses, other animals, plants, food items, financial instruments, any types of services, or just about anything else you can think of that may be bought and sold.

In the example shown in FIG. 1, an auctioneer 52 administers the transaction by accepting bids from bidders 54 and encouraging bidders to out bid one another in order to achieve a highest bid. In the particular example shown, the auctioneer is a human being physically located at the "block" and thus co-located with the item 50 to be sold. However, in some implementations, the auctioneer 52 could be implemented by a computer program, or the responsibilities of auctioneer could be divided between a computer program and a human being. In some instances, the auctioneer 52 might be located remotely from the item 50 being sold as opposed to being physically co-located with the item.

In general, the responsibility of auctioneer 52 is to conduct a "live" auction in the exemplary illustrative non-limiting implementation—meaning that the auction takes place within a relatively short amount of time wherein all bids must be submitted "live" during the auction and before its termination. However, in other non-limiting illustrative exemplary implementations, different arrangement might be possible or desirable.

In the example shown in FIG. 1, bidders 54 may be physically present at the auction "block", or they may be connected remotely to the auction via a so-called "simulcast" connection. Remote bidders 54 may be using Internet browsers with appropriate multimedia plug-ins to receive live video/audio feeds so they can see and hear the auctioneer 52 as well as inspect the item 50 and also watch live bidders 54 on site submitting their bids. The "live" dimension of the exemplary non-limiting auction provides a degree of excitement, urgency and reliability that may not necessarily be easy to entirely duplicate or simulate when conducting a "virtual" auction in cyberspace. However, different dynamics and experiences may be acceptable in different contexts.

Such exemplary non-limiting simulcast features extend the physical auction experience onto the Internet by
  allowing dealers to participate in auction sales remotely;
  providing audio and video of the live auction;
  allowing dealers to bid on and purchase vehicles as though they were standing in the lane.

Simulcast offers participants access to physical auctions from a remote location. It allows participants to participate in auction sales that they normally would not, due to for example:
  geographic location,
  a scheduling conflict,
  inability to leave the dealership or other place of business,
  need to reduce travel related expenses.

Simulcast also allows participants to monitor the activity in the marketplace.
  Example steps for using simulcast are:
  login to simulcast,
  watch and listen to the sale,
  monitor the bidding activity,
  bid on items of interest,
  purchase items,
  receive sale confirmations via fax or other means,
  return the confirmations to the auction with signature, payment information, and transportation information,
  remit payment,
  receive title and possession of item.

There are five interesting features of the simulcast buyer window:
  1. Audio and video. Audio and video allow users to see and hear the live physical auction from a remote location.
  2. Item information. In the case of motor vehicles, shows the vehicles' year, make, model, VIN, color, mileage, installed options, seller, and announcements. Also displays vehicle light status (light definitions may vary from auction to auction).
  3. Auction log. In addition to listening to the auctioneer, users can view the bidding activity in the AuctionLog on the simulcast screen.
  4. Bidding controls. The bidding controls allow users to place bids and to view the current high bid. Click on the "bid" button to place a bid on the current vehicle at the current asking price.
  5. Vehicles purchased. This box will track the number and dollar amount of items purchased in the lane users are viewing. If a bidder purchases an item via simulcast, in addition to hearing the auctioneer announce the purchase, the bidder can view your bidder number and rep name in the AuctionLog.

FIG. 1 also shows an example remote or absentee seller 56 participating in the transaction from a remote location. In the example shown, remote seller 56 uses a Internet-enabled appliance such as for example a personal computer equipped with an Internet browser and appropriate multimedia plug-ins to communicate with the auction/sale process. In other example arrangements, the remote seller 56 might use a cellular telephone, a personal digital assistant, or any other appliance providing connectivity. In the example shown, the desired connectivity permits the remote seller 56 to receive and see and hear a live multimedia audio/video feed from the auction location, but other types of contexts may rely on live video only, live audio only or data reporting without the need for live multimedia.

In the particular illustrative non-limiting exemplary implementation shown in FIG. 1, the remote seller 56 also operates appliance 58 to provide messages including:
  messages privately displayed or otherwise communicated to auctioneer 52;
  messages displayed to both auctioneer 52 and all bidders 54;
  other types of messages.

Examples of messages displayed or communicated only to the auctioneer 52 include for example an indication that the item on the block is "OK to sell" at the current high bid price. Such a communicated message gives the auctioneer the freedom to sell the item at that high bid or to a still higher bidder. While it would be possible to communicate this indication to all bidders 54 in addition to auctioneer 52, there may be reasons in connection with the dynamics of the ongoing auction why the indication should be communicated only to the auctioneer by way of a private communication from the seller 56 to the auctioneer 52. Note that in the live auction where the seller is physically present, the seller might indicate that the item was "OK to sell" by making some sort of prearranged signal to the auctioneer—this signal being either a secret prearranged signal or a common conventional signal that any other auction participant may understand.

An example of a message from the remote seller 56 that may be shared with the auctioneer 52 as well as a particular bidder(s) 54 might be, for example, a "not OK to sell" indication along with a counteroffer. For example, if the high bidder has bid a certain dollar amount that the seller 56 does not feel is adequate, the seller might counteroffer for a higher amount to see if the high bidder is willing to pay that higher amount. Such a counteroffer could be displayed only to the current high bidder who is the subject of the counteroffer, or it might be displayed to all bidders 54 as well as the auctioneer 52. If the high bidder accepts the counteroffer, then a binding sale agreement is formed. If the high bidder declines the counteroffer, then no sale is made. The high bidder may also be given the opportunity to decline the counteroffer but respond with a further counteroffer for the remote seller 56 to consider.

During the auctioning process, it may become necessary for the remote seller 56 to temporarily stop participating in the ongoing auction or other transaction but with an intention to rejoin at a later time. In such cases, the system shown in FIG. 1 may monitor the remote seller 56's keystrokes and other inputs to determine whether the remote seller is present. If, in response to a poll, the system determines that the remote seller 56 is no longer present, a computer logging arrangement may "mark" the remote seller as being no longer present and send a message to that effect for display on the auctioneer's display and the remote seller 56's appliance 58. Such a screen or other message may give the remote seller 56 an opportunity to reactivate his or her participation by sending a responsive message—allowing the remote seller to rejoin the auction or other transaction in progress.

Exemplary Non-Limiting Illustrative Architecture

Figure 2A:
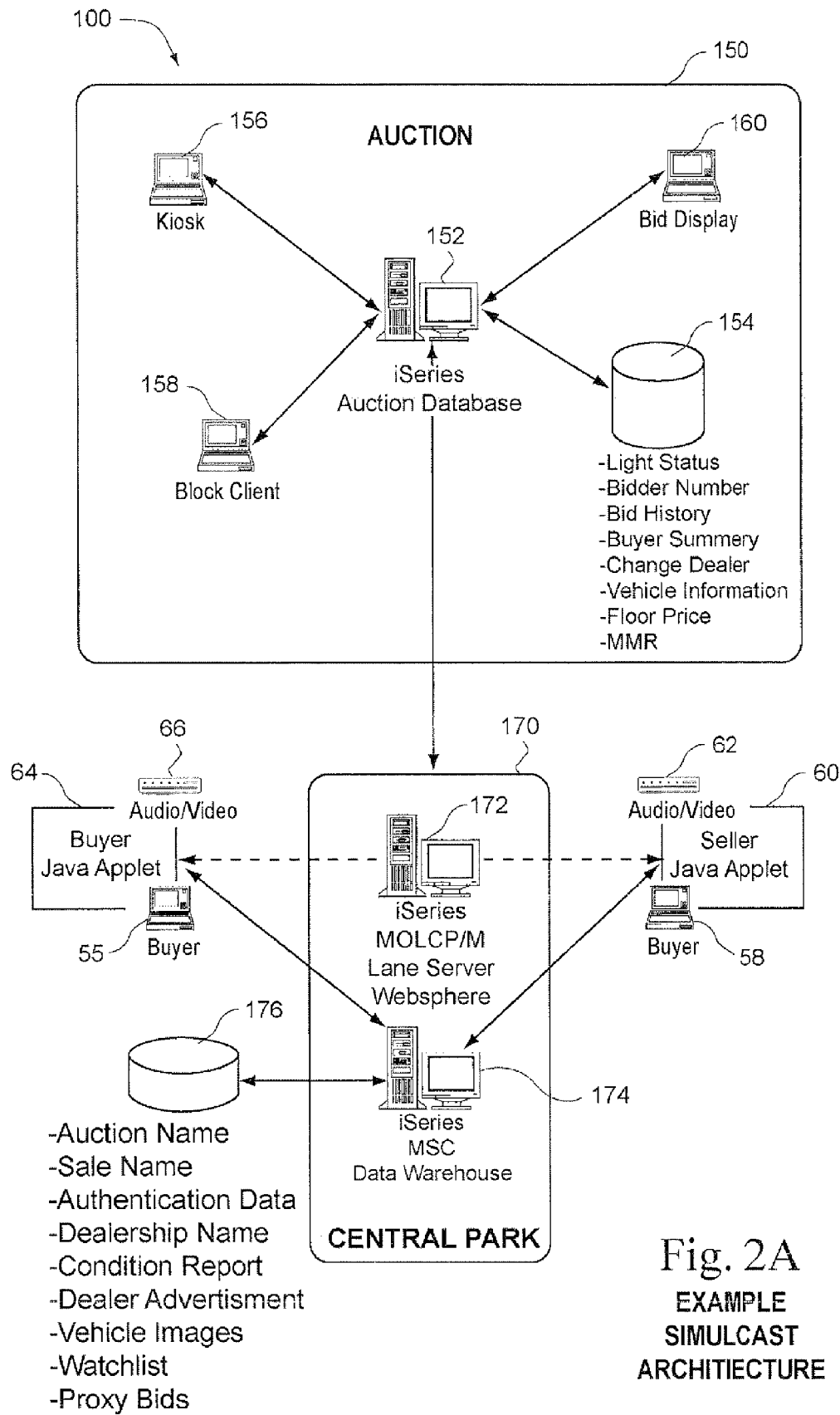
FIG. 2A is a schematic illustrative of an exemplary illustrative non-limiting simulcast architecture.

FIG. 2A shows an exemplary illustrative non-limiting simulcast architecture 100 that may be used to implement the system 20 shown in FIG. 1. In the particular FIG. 2 implementation shown, architecture 100 includes an on site auction installation 150, a centralized data system 170, a remote seller appliance 58 and a remote bidder appliance 55. As shown in FIG. 2A, the remote seller appliance 58 may include a personal computer or any other appliance having an indication means, an input means and a communications means. In this particular non-limiting example, the remote seller appliance may include a personal computer with an Internet browser of conventional design that displays HTML, XML and other Internet type data and World Wide Web pages, such browser may use or be compatible with conventional http and https Internet protocols and conventional multimedia data transmissions protocols such as RTP based upon various well known Internet standards. In the example shown, a seller java applet 60 is downloaded to the seller appliance 58 on demand, this java applet providing certain display, interactivity and other capabilities supplied by the centralized data system 170. In the example shown, the seller appliance 58 also includes audio/video reproduction capabilities 62 including for example real time video display capability and real time audio feedback capability. In some examples, the audio/video could be interactive two-way (i.e., the seller appliance 58 can both send and receive images and audio), whereas in other contexts it may be sufficient to receive audio and video feeds from the auction site 150 and provide feedback via data inputs only. In still other contexts, the remote bidder 58 may be able to interact in a variety of different ways including for example audio feedback only, constrained or unconstrained data input, telephone contact, or other arrangements.

Also as shown in exemplary FIG. 2A, the buyer appliance 55 may also include buyer Java applet 64 and an associated audio/video reproduction capability 66.

The centralized data system 170 in the example shown may include a web server 172 and a data warehouse 174 having access to a database 176. The database 176 may store detailed information about various transactions/sales including for example:
- auction name,
- sale name,
- authentication data,
- dealership name,
- condition report,
- dealer advertisement,
- vehicle images,
- watch list,
- proxy bids,
- other.

In the example shown, the central system 170 may communicate with both the seller appliance(s) 58 and the buyer appliance(s) 55 via data communications paths including but not limited to the Internet. The buyer and seller appliances 55, 58 may also communicate directly with the data warehouse 174. In one exemplary illustrative non-limiting implementation, data warehouse 174 and/or web server 172 downloads applets 60, 64 to the appliances 55, 58. These applets then draw on different types of information from web server 172 and data warehouse 174 in order to provide comprehensive informative auction status and other displays for display to the bidders 54 and sellers 56. In the example shown, the bidders 54 and sellers 56 receive different types of displays, with the central installation 170 first authenticating users and then sending appropriate information to appropriate users depending upon their role in the transaction.

As also shown in FIG. 2A, the onsite auction installation may include a local database 152 having access to a variety of local data 154 including for example the following:
- light status,
- bidder number,
- bid history,
- buyer summary,
- change dealer,
- vehicle information,
- floor price,
- MMR,
- other.

The local database 152 may provide this information for display by various local devices including a kiosk 156, a block client 158 and a bid display 160. The block client 158 may, for example, be operated by auctioneer 52 or an assistant to the auctioneer (e.g., a block clerk who is responsible for communicating the high bid to the seller and prompting the consignor to approve or reject the high bid—the block clerk also aids in communicating the seller's decisions to the auctioneer). Kiosk 156 may be a walkup interactive appliance at the auction site that local bidders or sellers may use in lieu of raising their hands or otherwise participating live in the auction. Bid display 160 may provide informative information to all viewers and may in one example be a large-size display such as for example a billboard or other large video screen.

Figure 2B:
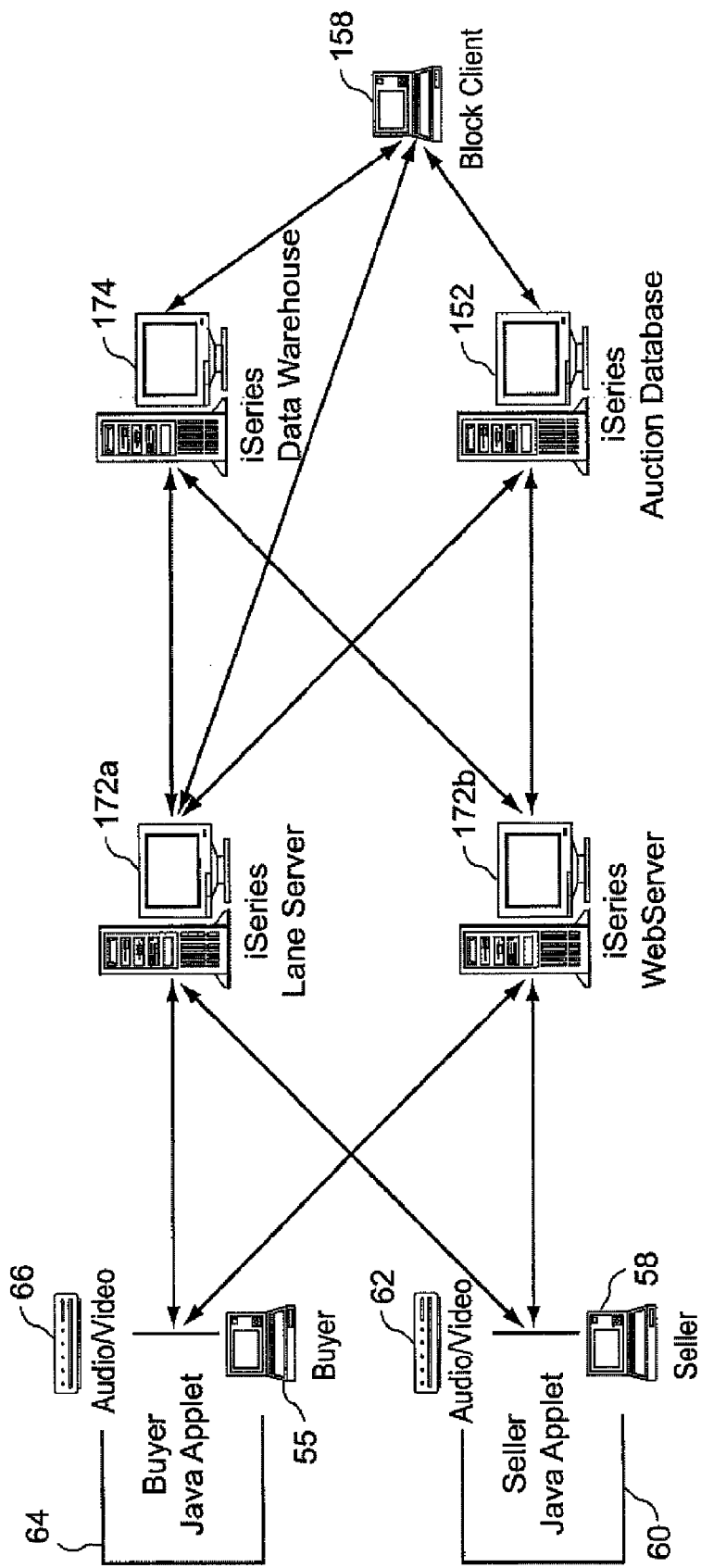
FIG. 2B is a schematic illustration of an exemplary illustrative non-limiting simulcast data flow.

FIG. 2B shows an example simulcast data flow showing how different parts of the FIG. 2A architecture interact with one another. In the example shown, the buyer and seller appliances 55, 58, respectively, in general communicate with an intermediate architectural layer provided by the lane server 172a, web server 172b—and these 172 components then communicate with the "back end" which in the example shown comprises the data warehouse 174, the auction database 152 and the block client 158. In more detail, the block client 158 communicates with the data warehouse 174, the auction database 152 and the lane server 172a (which is part of the lane server/web server 172 shown in FIG. 2). The data warehouse 174, in turn, communicates both with the block client 158, the lane server 172a, and the web server 172b. The auction database 152 communicates with a block client 158, the lane server 172a, and the web server 172b. The lane server 172a communicates with the data warehouse 174, the block client 158, the auction database 152, the buyer Java applet 64, and the seller Java applet 60. The web server 172b communicates with the buyer appliance 55 and associated applet 64, the seller appliance 58 and associated seller Java applet 60 (in fact, in the exemplary arrangement, it is the web server 172b that downloads those applets to the buyer and seller appliances 55, 58, respectively), as well as with the auction database 152 and the data warehouse 174.

Example Screen Display Format

Figure 3:
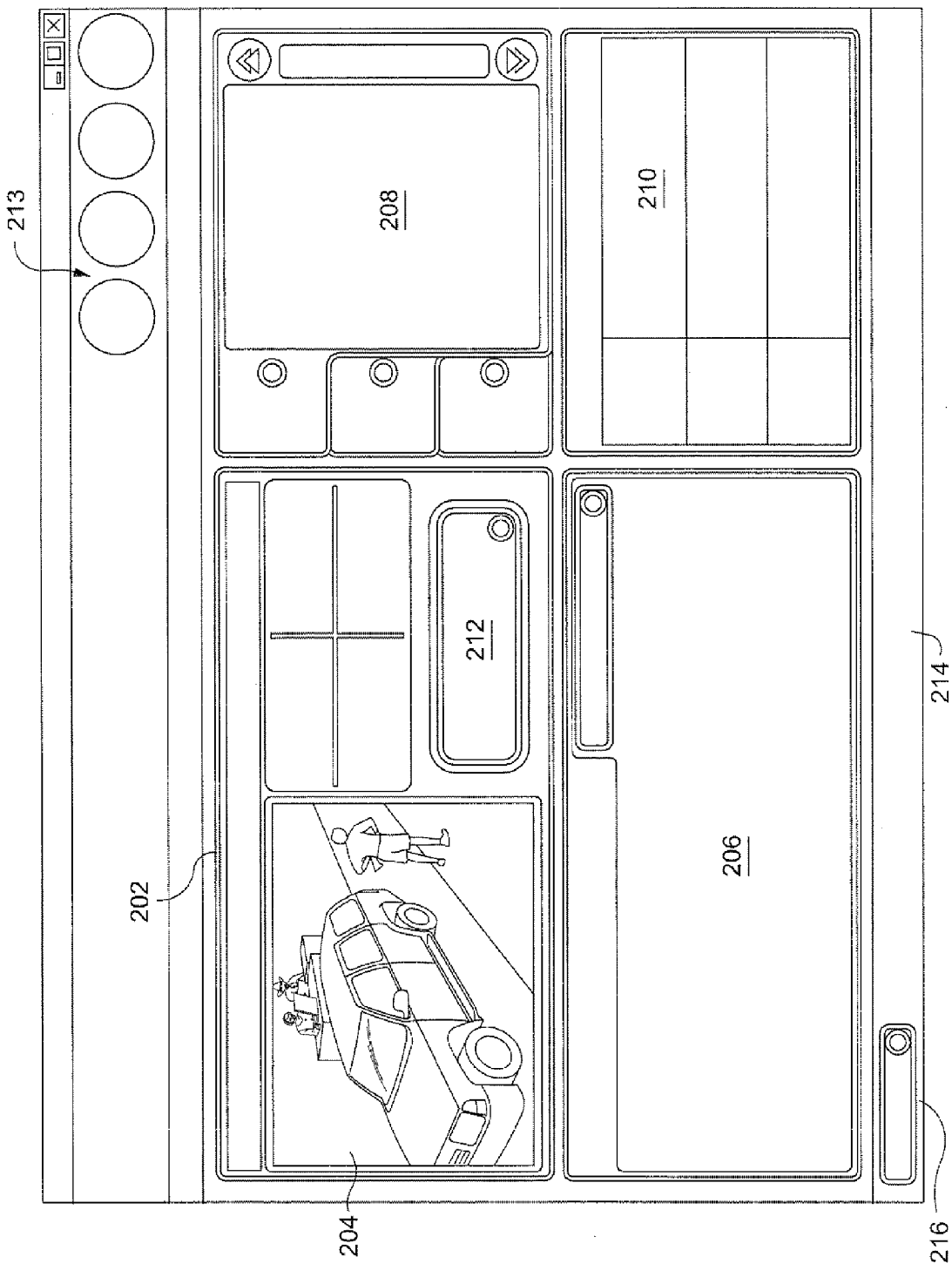
FIG. 3 shows an example illustrative screen display format.

FIG. 3 shows an example screen display that remote buyers 54 and remote sellers 56 see displayed on their appliances 55, 58 during an example auction/sale. The display shown is divided into four exemplary areas:

a main status area 202 including a live-action video display 204;

a vehicle information display section 206;

a supplemental information display section 208; and a "next item" display section 210.

In the example shown, the main information section 202 provides information about what is going on right now in the auction/sale. The live action video display 204 displays what's going on at the auction site so that the seller 56 and buyers 54 can see the item currently being sold, watch the auctioneer 52 and any buyers 55 who are participating on-site, etc. A corresponding audio feed allows remote buyers 54 and remote sellers 56 to hear the auctioneer 52 and any other exchanges going on at the auction. The live video display 204 presented on the remote users' computers 55, 58 allows the remote users to feel like they are present at the auction and have more or less complete information about what is going on. This takes the mystery out of remote participation and may also add the feeling of excitement and time pressure that anyone has ever been to a live auction has experienced. The main display 202 also provides additional information including the current high bid amount, the identity of the current high bidder and very clear information identifying the item that is currently on the block. A bid history display shown in supplemental portion 208 shows the entire history of bidding for the current item including all bids submitted and auctioneer comments. Remote users 54, 56 can scroll down this bid history during the sale to reference entries that occurred earlier in the auctioning of this particular item. The item description field 206 provides detailed information about the item currently being sold including identification information, any disclaimers or notes, etc. In addition, the page shown in FIG. 3 provides status lights in the upper right-hand corner of the display that gives quick-glance status information on the sale of this particular item. Users learn to recognize the stage of the sale simply by viewing the status lights. For example, if the auctioneer is getting to accept the highest bid to sell the item, the particular status light indicates this and so any buyers 54 who are holding back immediately understand that if they do not submit their bid now it will be too late (and remote sellers can get ready to make a decision as to whether to accept the bid).

Example Bidder Functionality/Displays

Figure 4A:
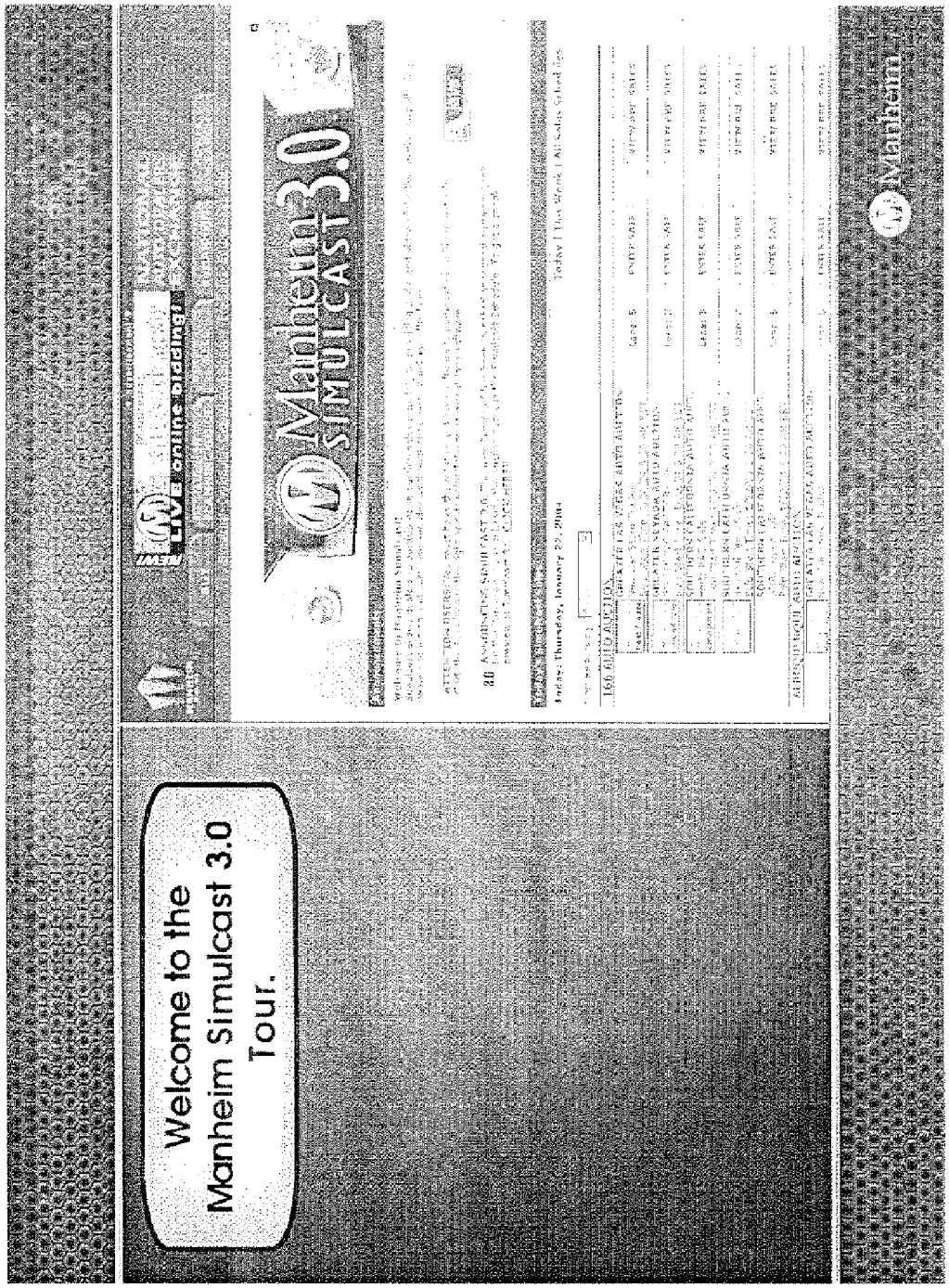
FIGS. 4a-4i show example illustrative display screen sequences for a bidder's participation in an exemplary auction/sale.
Figure 4B:
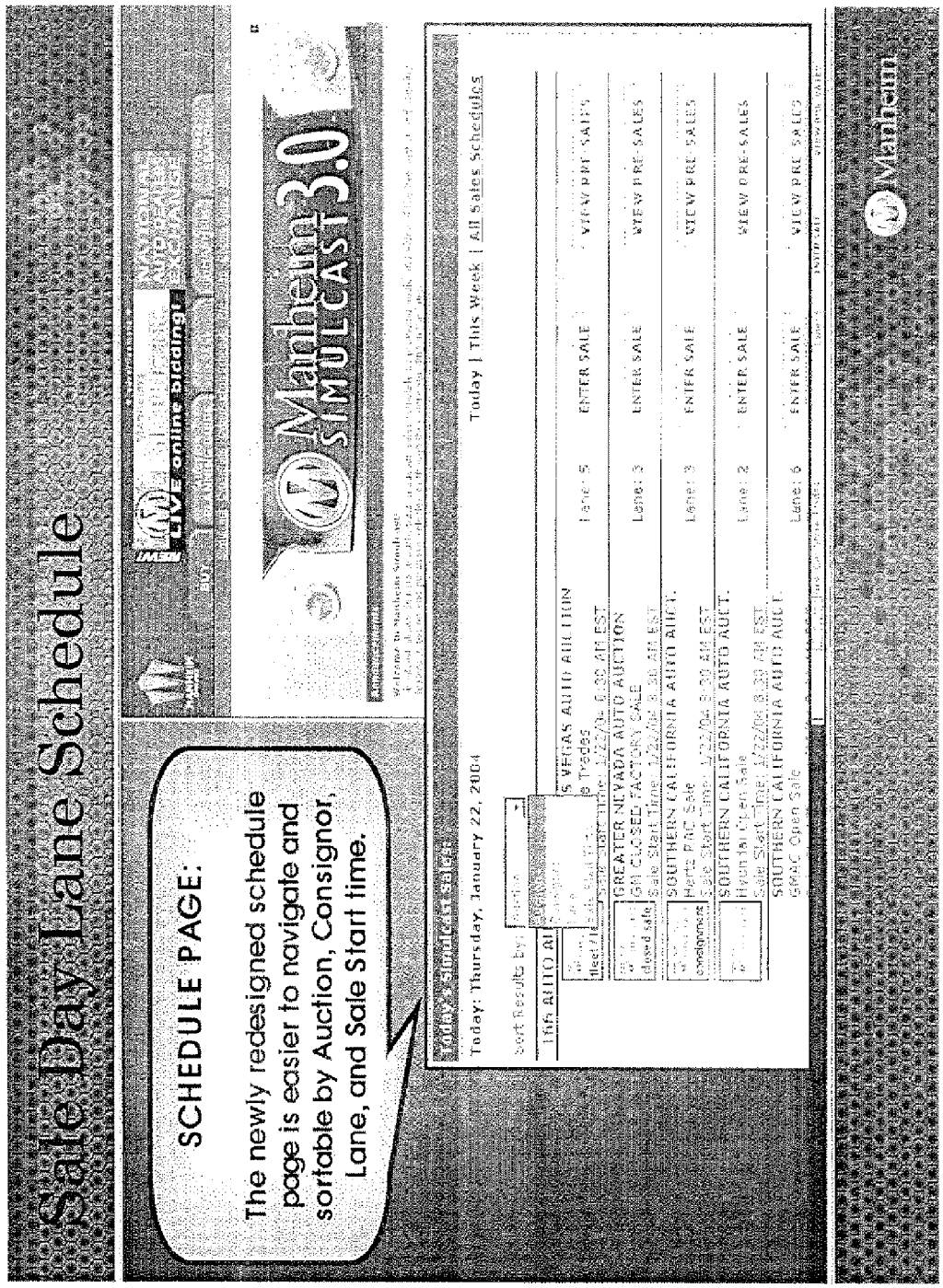

FIGS. 4a-4i show example illustrative non-limiting displays that system 20 presents on bidder appliances 55 to provide auction/sale functionality. Once the remote buyer 55 has logged on and has been authenticated by system 170, system 170 presents to the buyer's appliance 55 an auction selection screen of the type shown in FIG. 4a that lists auctions/sales the buyer can participate in. Each displayed item provides location, description and time/date information as well as an opportunity for the buyer to view any presales information. As shown in FIG. 4b, the exemplary system 20 allows the buyer 55 to sort results by auction, consigner, lane for sale start time to provide more convenient displays. This schedule page provides easy navigation to enable buyers 55 to quickly find auction/sales that they are interested in.

Figure 4C:
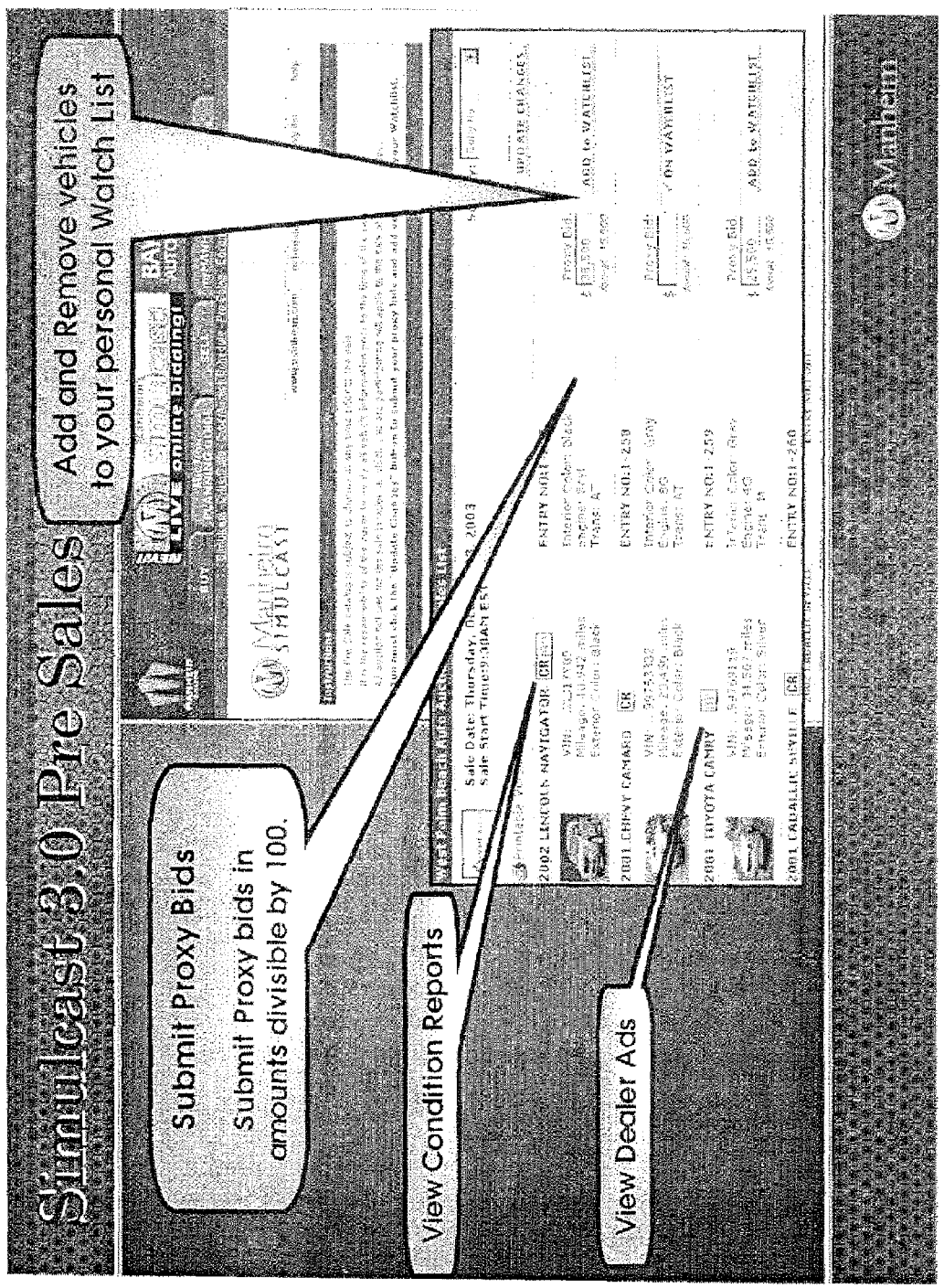

When the remote buyer 55 decides to review presale information associated with an auction/sale, a display such as the one shown in FIG. 4c is provided. This display allows the buyer to view the items (e.g., motor vehicles in this particular auction) that are scheduled to be sold at that particular sale along with other descriptive information (e.g., dealer ads, condition reports, etc.). The FIG. 4c display allows buyers to submit proxy bids which system 170 will submit on their behalf during the auction. In addition, buttons alongside each listed item allow the buyer 55 to easily add and remove items to their personal watch lists. These watch lists make the auction more user friendly by allowing the buyers to keep track of the items they are interested in.

Figure 4D:
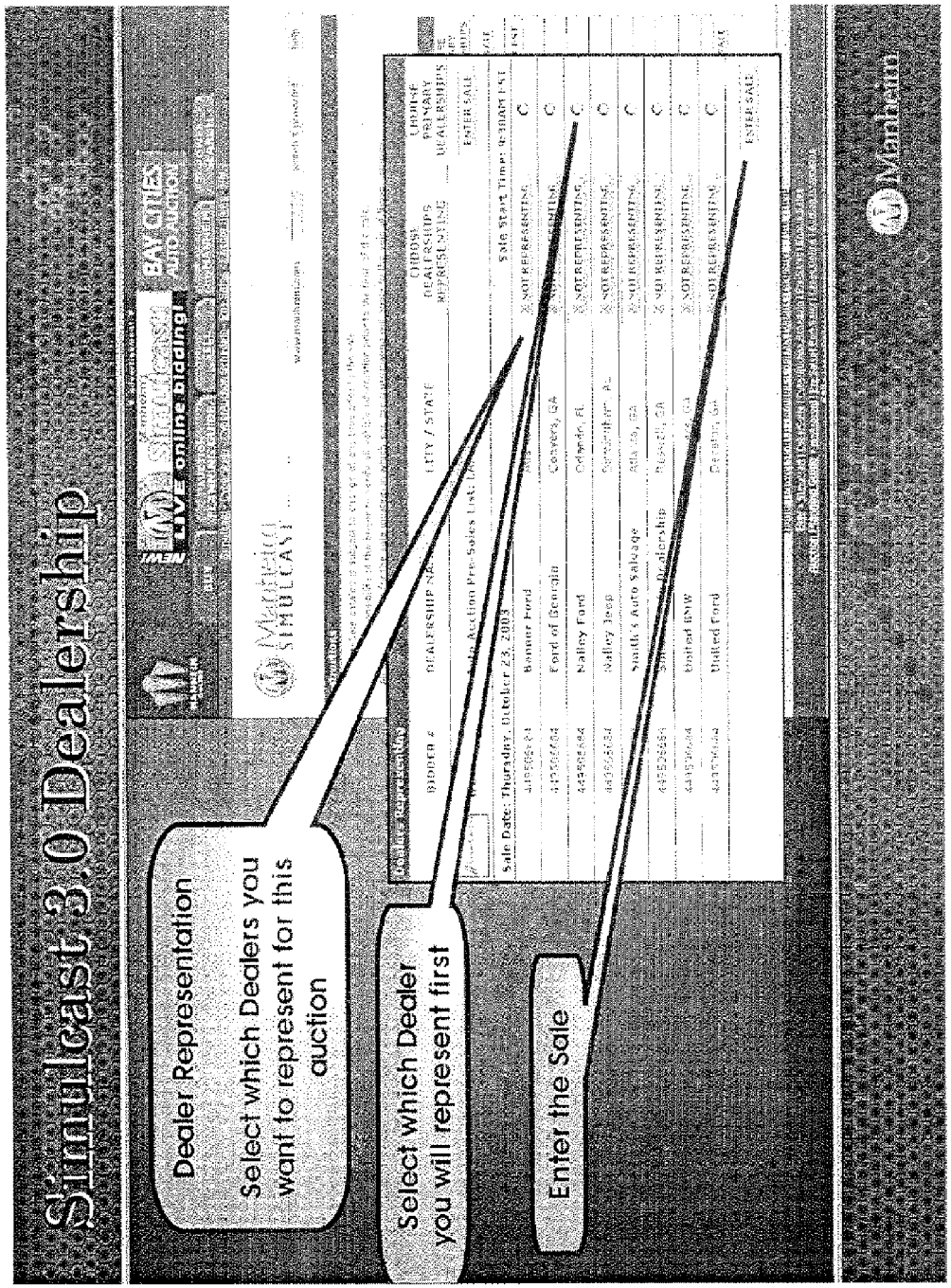
Figure 11:
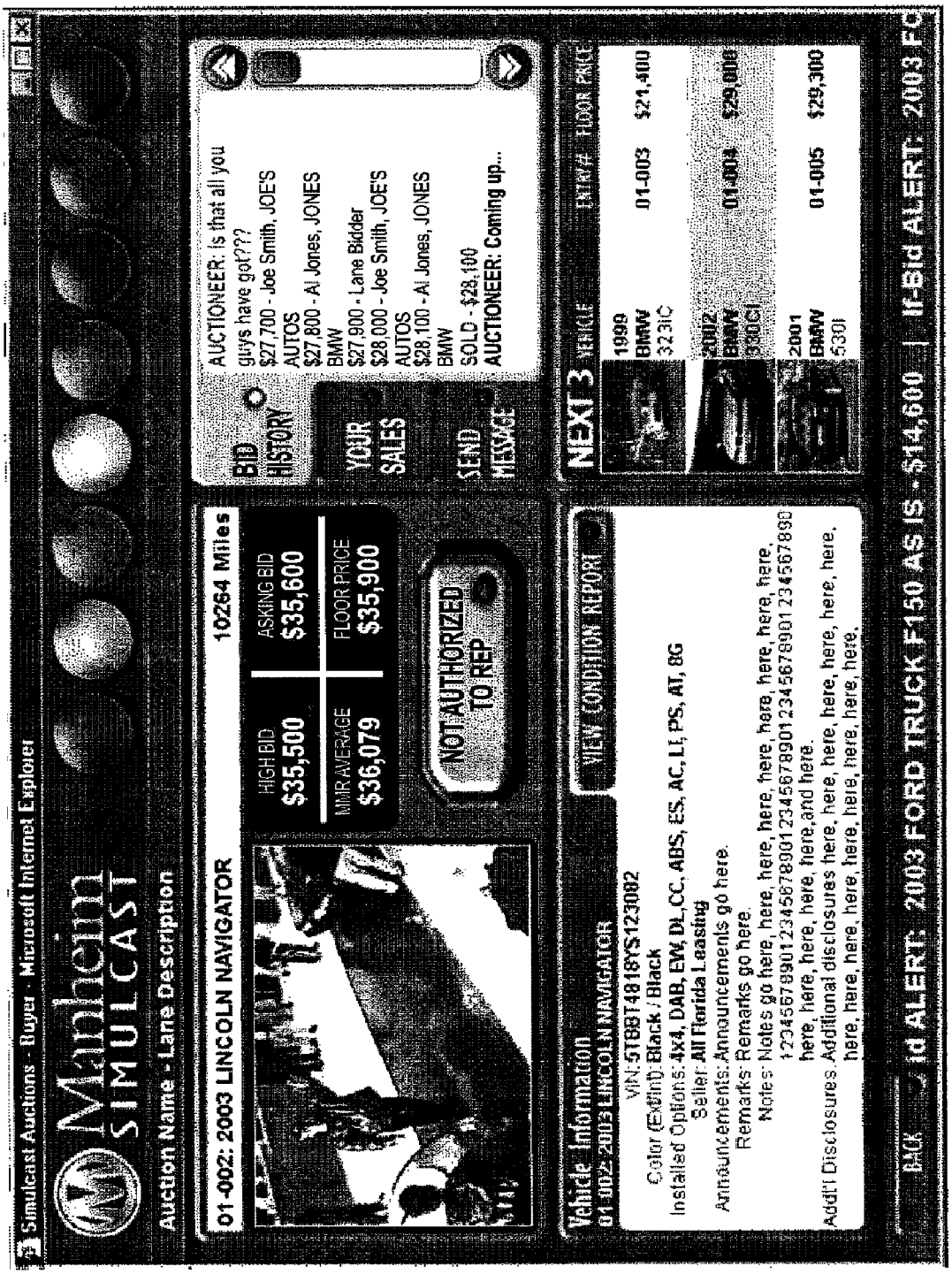
FIG. 11 shows an exemplary illustrative non-limiting remote seller display screen indicating that the remote seller is not authorized to represent the seller on a particular transaction.

FIG. 4d shows an example screen that allows an auction participant to state which dealer or dealers that individual is representing in the auction. The selections made in FIG. 4d are subject to authentication so that only authorized users are permitted to represent other entities in the auction FIG. 11 shows an example screen display that is provided to a remote seller when the remote seller is not authorized to represent that particular item).

Figure 4E:
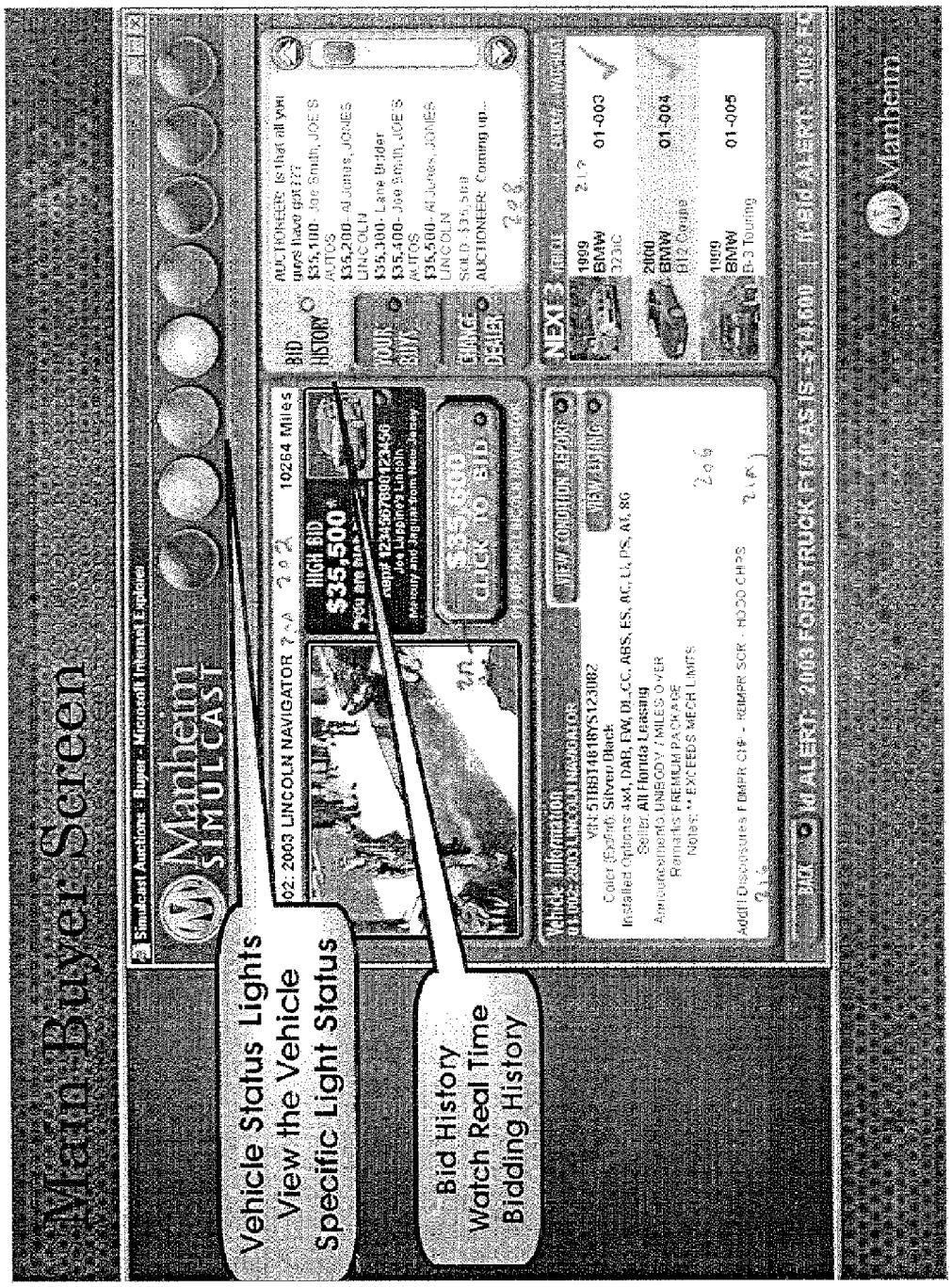
Figure 4F:
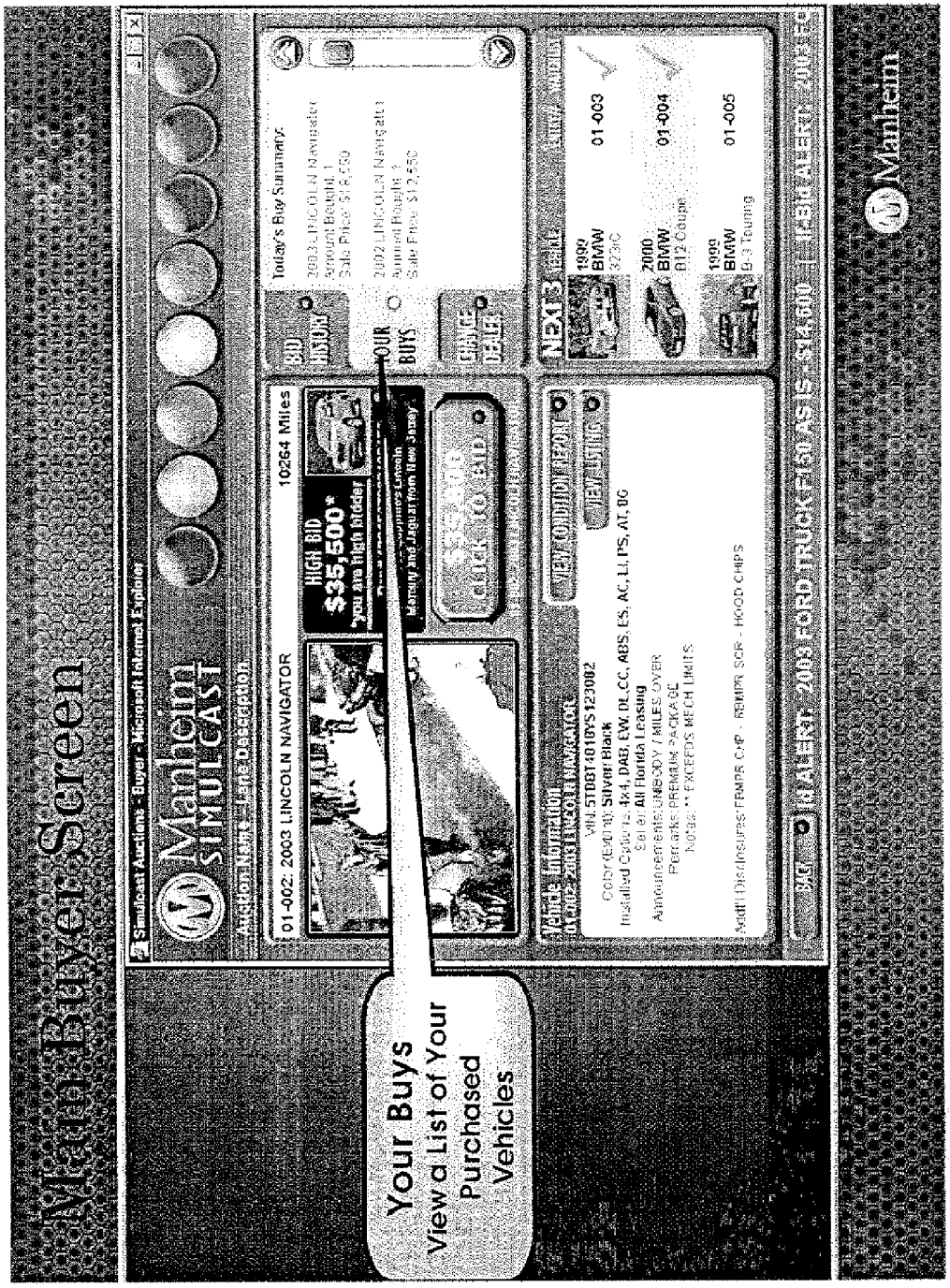
Figure 4G:
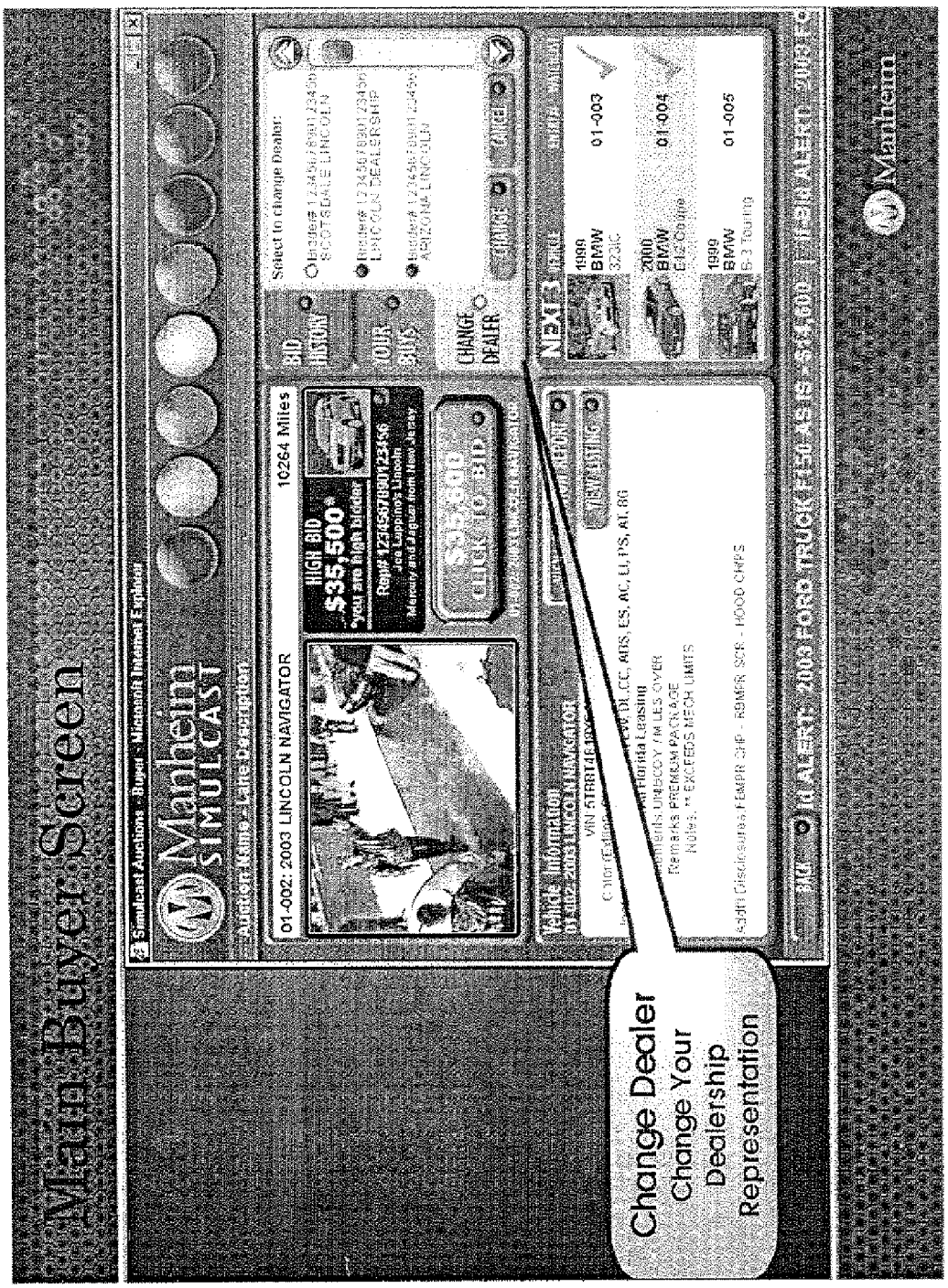

FIG. 4e shows an example auction screen of the type shown in FIG. 3 but customized for the remote buyers 54. For example, the FIG. 4e display includes a "click to bid" button 202 that a remote buyer 55 can click or select to submit a bid. Also, the supplemental display area 208 shown in FIG. 4e for a buyer allows the buyers to select "your buys" and "change dealer" instead of the "bid history" display shown in FIG. 4e at a touch of a button selection. FIG. 4f shows an example "your buys" display that keeps track of the buyer's inventory purchased during sales in this particular auction/sale. The "change dealer" button shown in FIG. 4a if selected may bring up a display of additional entities as shown in FIG. 4g which the buyer may be representing. For example, if a buyer is acting on behalf of several different principals, the buyer may, at will, select a different principal to represent at any time during the auction/sale at a touch of a button.

Figure 4H:
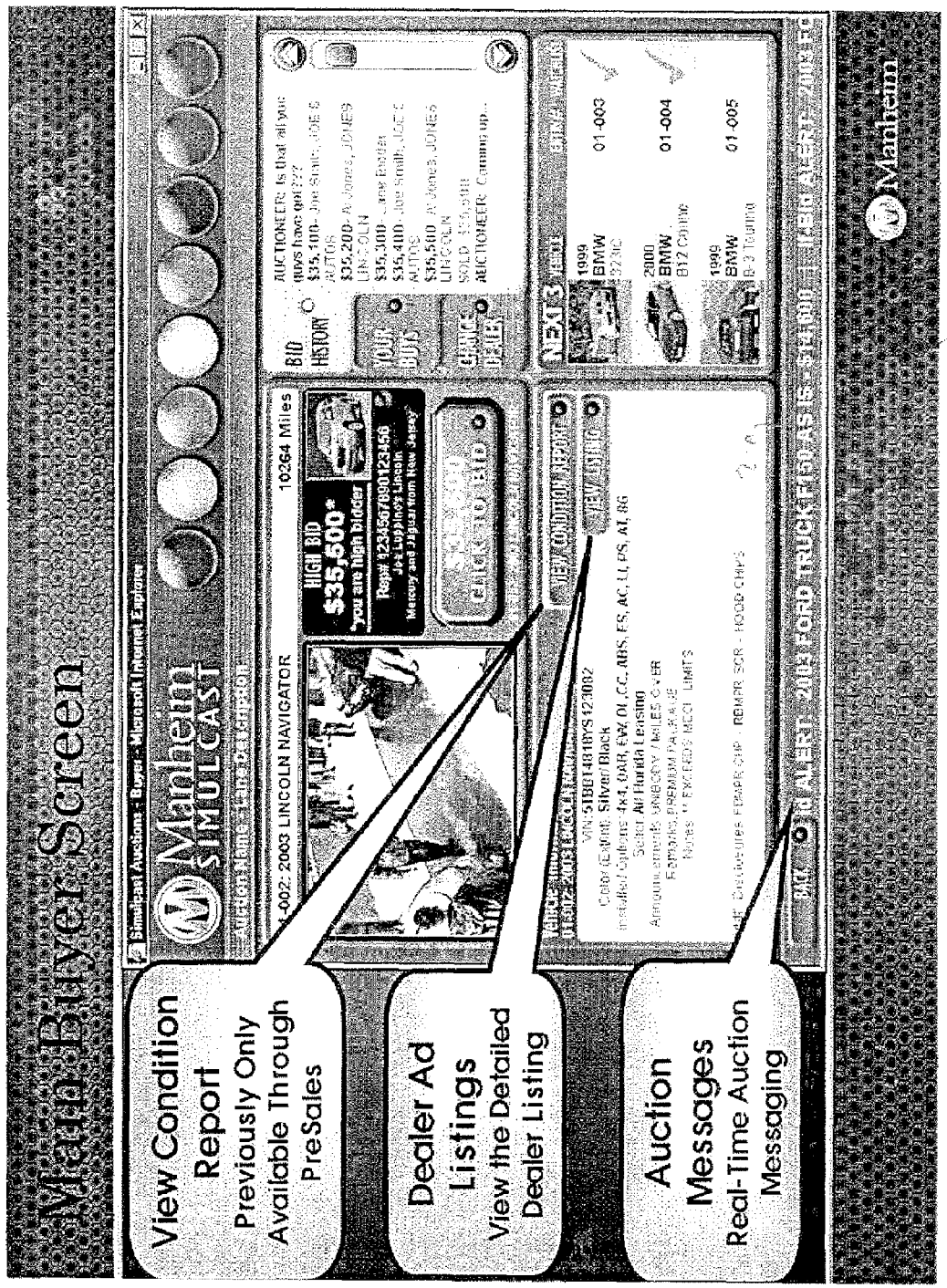

FIG. 4h emphasizes additional details of the exemplary FIG. 4e screen. As shown in FIG. 4h, the remote buyer 54 may, also at will, view a condition report or the detailed item listing at a touch of a button to get complete information about the item. The buyer can view a detailed item condition report at any time—even in the middle of the auction/sale. Similarly, the buyer can view the advertisement/listing associated with the item to get additional information. The FIG. 4h display also emphasizes the messaging line 214 at the bottom of the screen that provides real-time auction messaging.

Figure 4I:
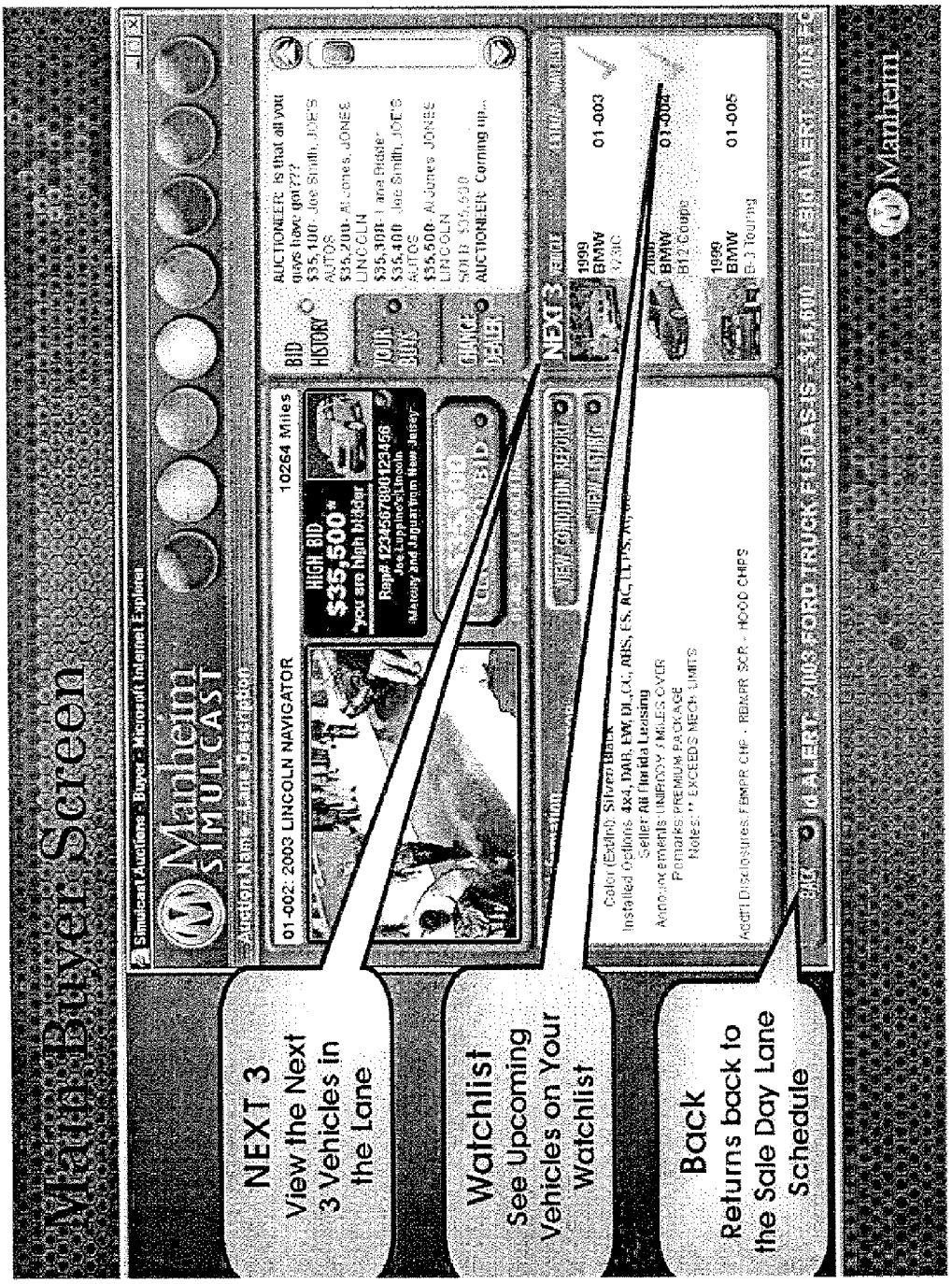

FIG. 4i focuses on the "next item" display portion 210 shown in FIG. 4e. In the example shown, this "next item" display gives the buyer a preview of the next item or items to be auctioned in this particular "block" or "lane". If the buyer were present at the live auction on site, the buyer would be able to see the next few items that are in line to be sold. The display portion 210 provides this same information to remote buyers 54 connected to the auction/sale via appliances 55. In this particular example, a large check mark indicates if the particular items upcoming in the sale are on the buyer's pre-selected watch list. Selecting a "back" button 216 at any time returns the user to the listing of sale day lane schedule.

Example Remote Seller Functionality

Figure 5A:
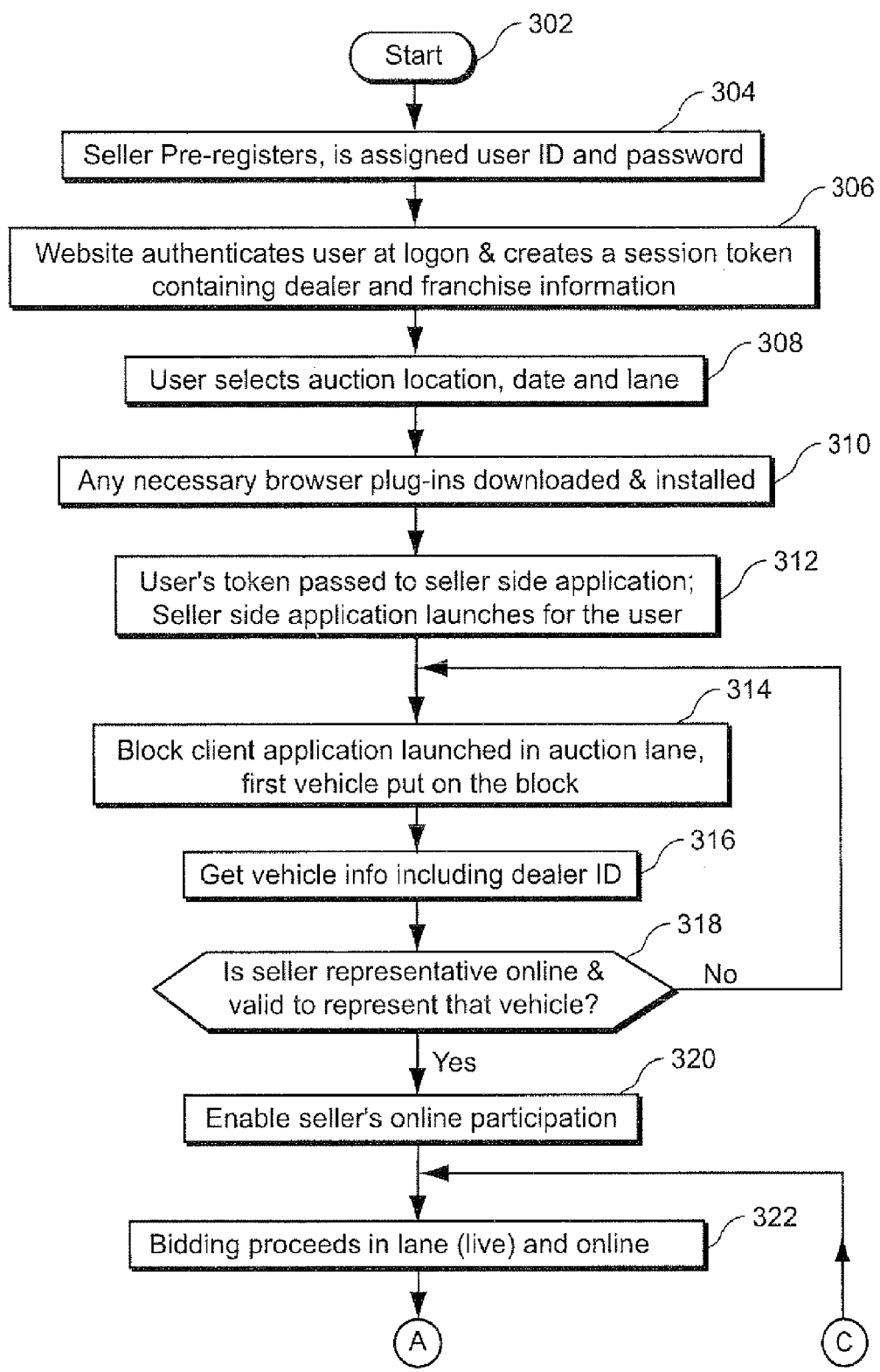
FIGS. 5a-5b are together a flowchart of exemplary illustrative non-limiting steps performed to permit remote seller participation.
Figure 5B:
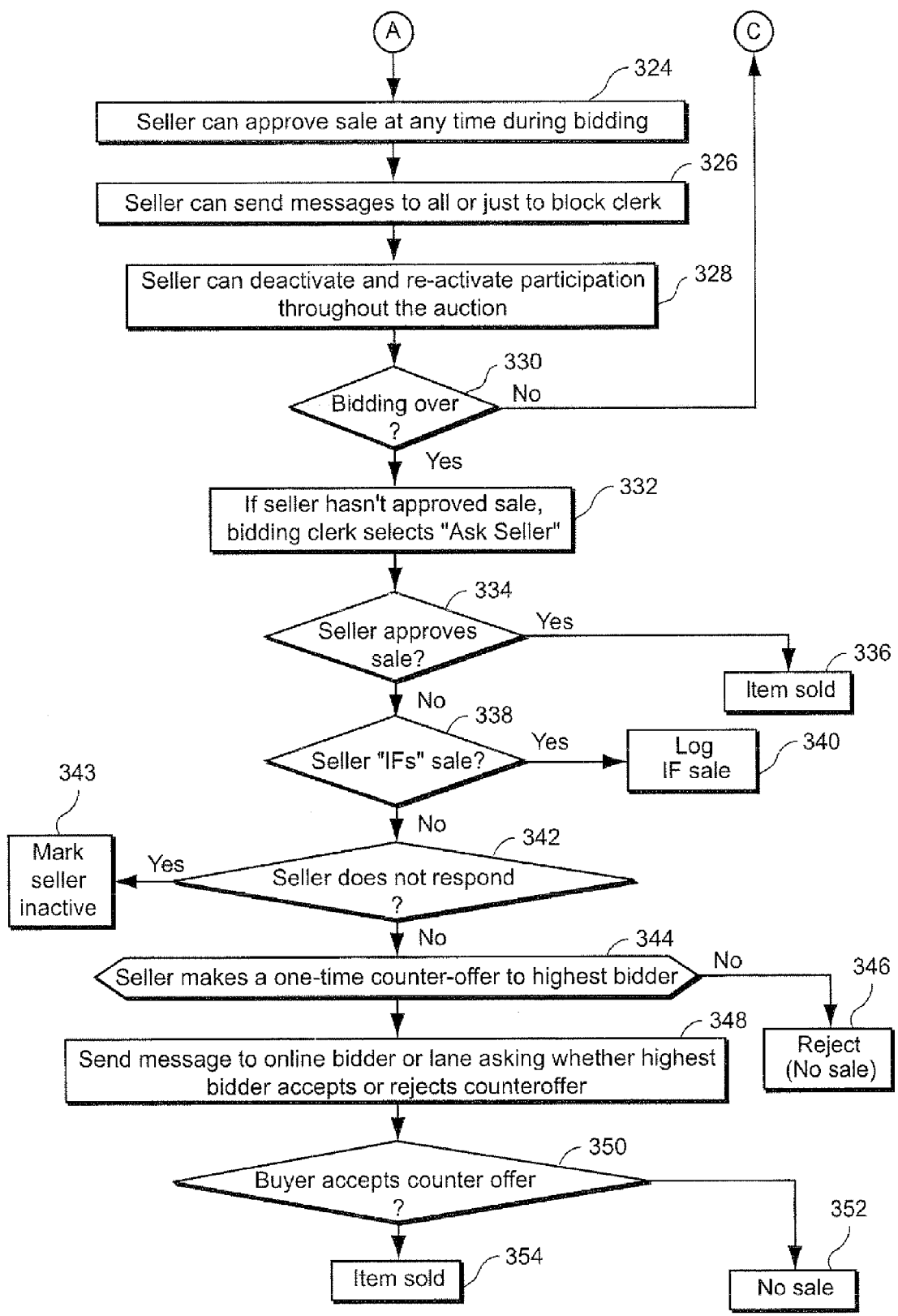

FIGS. 5a-5b show example steps that system 20 performs from the perspective of a remote seller 56, and FIGS. 6-11 show example remote seller screen displays. In general, the exemplary absentee seller function of system 20 allows sellers to approve the sale of items remotely. Sellers have the ability to "approve", "if sale", "no sale" or propose a "counter offer" for each item they represent. The absentee seller function can be employed in sales with all buyers located at the auction/sale site, all buyers located remotely, or any combination.

To start the process (FIG. 5a block 302), the remote seller 56 points his or her web browser in the exemplary implementation to a particular URL that allows the remote seller's appliance 58 to access system 170. In the exemplary implementation, before the seller 56 can participate, he or she needs to pre-register and be assigned a user ID and password (FIG. 5a, block 304). Such pre-registration may in some cases be handled in person or by telephone or ordinary mail in order to ensure security, although online pre-registration is also possible.

The user then accesses system 170 and presents the pre-assigned user ID and password. System 170 authenticates the user's logon and creates a session token containing dealer and franchise information (FIG. 5a, block 306). When the user logs on using a pre-assigned user name and password, system 170 can verify all of the dealer numbers, franchises and businesses the dealer is valid to represent at each auction location he is registered for. This functionality ensures that the remote seller 56 is able to make decisions only with respect to sale items that he or she actually represents. The session token created by the central system 170 is, in the exemplary illustrative implementation, valid for as long as the user is signed on to that session.

Figure 6:
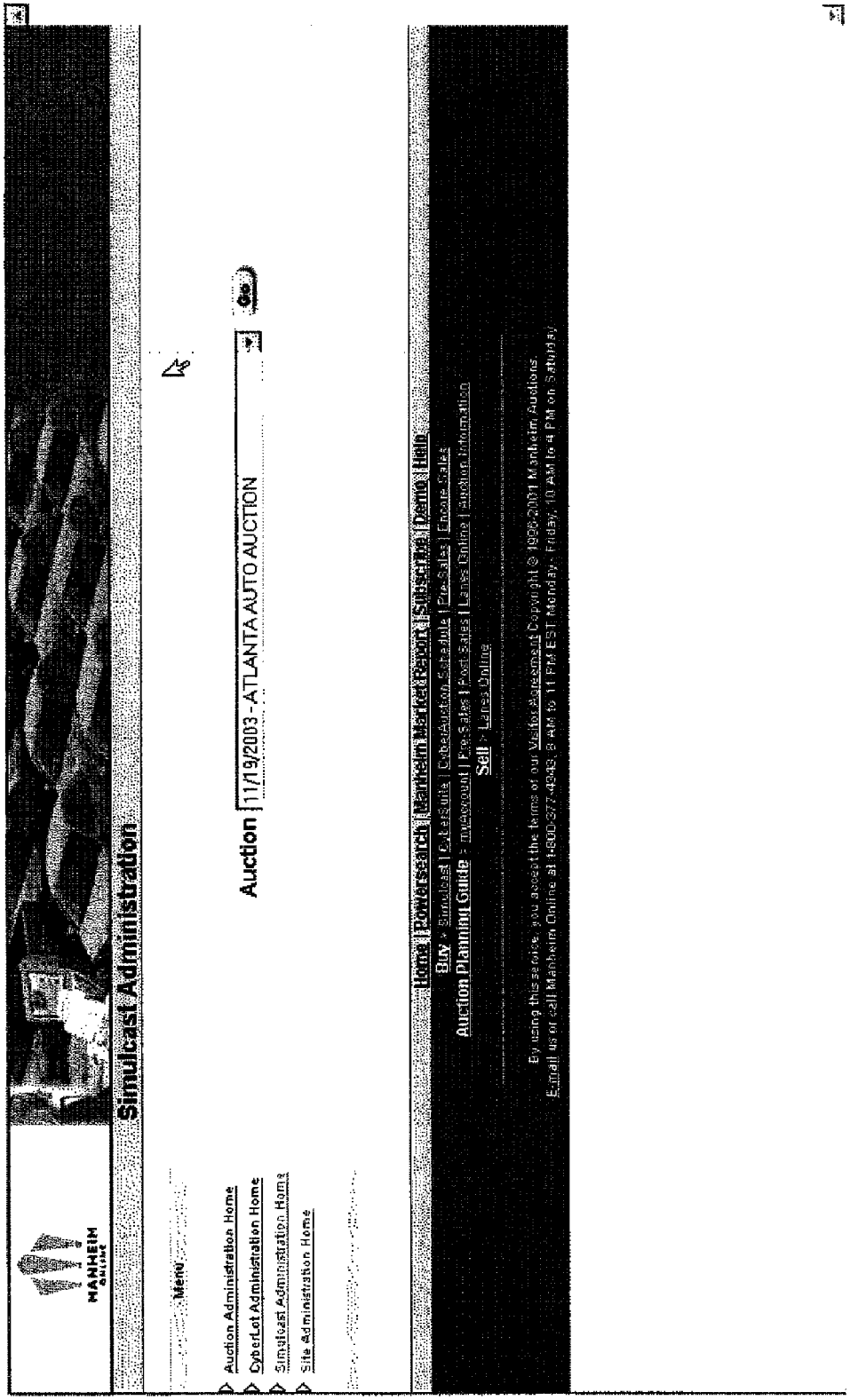
FIGS. 6 and 6a show exemplary illustrative non-limiting auction selection/scheduling screens.
Figure 6A:

Once clearing the authentication step, the remote seller 56 is presented with a screen of the type shown in FIG. 6 that allows the seller to select the date and auction/sale location the seller wishes to administer remotely (FIG. 5a, block 308). In the example shown, such selection may be from a pull down menu of schedule auctions/sales. Each sale in the exemplary implementation may include a number of lanes or "blocks", and the remote seller 56 is able to select a particular lane number using for example the display shown in FIG. 6a (FIG. 5a, block 308). For example, the seller typically selects the lane or block at the auction location for which his or her inventory was previously registered ("lane" refers to a line of motor vehicles, horses or other items waiting to be sold at an auction block). At this time, the token record may be passed to the seller side application to supply the dealer, franchise and other pertinent information relating to the remote seller. The seller side application may then launch (FIG. 5a, block 312) and check the token record information against the dealer information stored in data warehouse 174 to make sure the remote seller is authorized at that location and lane. Meanwhile, system 170 may automatically download any necessary browser plug-ins and install them on the remote seller's appliance 58 so that the functionality of the absentee seller screen shown in FIG. 7 may then appear (FIG. 5a, block 310). The launched seller side application may also display to the remote seller a display screen as shown for example in FIG. 7.

Meanwhile, the block client application 158 is launched in the auction lane to prepare for the auction (FIG. 5a, block 314). The block client application brings up the first item to be sold, and connects to the auction database 152 to get information pertaining to that item (FIG. 5a, block 316). This item information may also include the dealer number or other identification. On the first item and every subsequent item brought up by the block client application 158, the block client checks to see if a seller is online and that he is valid to represent that item (FIG. 5a, block 318). A seller is only valid to represent an item if his dealer number at the auction from the data warehouse 174 matches the seller number in the item file in the auction database 152 in the case of an open sale (in a closed sale, franchise information must match).

Once an item is brought up in the block client application 158, bidding can begin (FIG. 5a, block 322)—both live at the auction site and online via the buyer side application described above. The FIG. 7 exemplary illustrative absentee seller screen display shown to an authorized seller (FIG. 5a, block 318, 320) during bidding includes the elements shown in FIG. 3, but with some seller-specific functionality. For example, the main auction/sale status information 202 for a seller includes detailed pricing information in addition to the "high bid" information. For example, the "asking bid", "MMR average" price and "floor price" may also be displayed. In addition, the button 212 in this case may be labeled "OK to sell". The remote seller 56 selects this button at any time (FIG. 5b, block 324) to send a message to the auctioneer 52 (block clerk) indicating approval to sell the item on the block at the current price. At any time during the auctioning of that item on the block, the remote seller can click on "OK to sell" to approve of the sale of that item (FIG. 5b, block 324).

Figure 8:
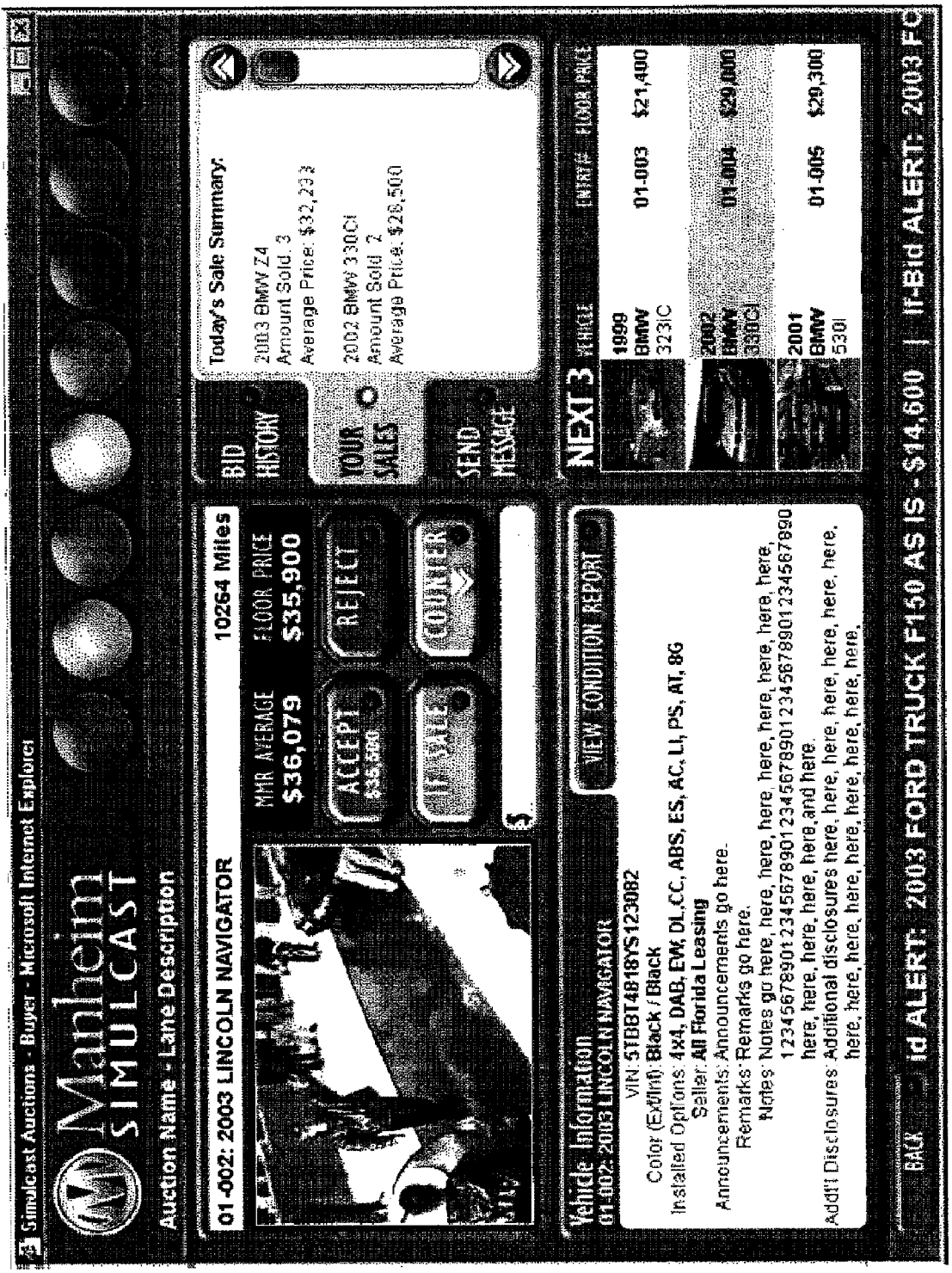
FIG. 8 shows the exemplary illustrative FIG. 7 screen with "your sales" selected.

If the item does not reach an acceptable price, and the "OK to sell" has not been utilized at the conclusion of the bidding (FIG. 5b, block 332), the bidding clerk selects "ask seller" which causes the display of the type shown in FIG. 8 to appear to the responsible seller. From this page, the remote seller is given the choice of:

"approving" the sale,
"no saling" the item,
"if saling" the item, or
proposing a counteroffer.

(Note: if the seller has already clicked the 'Ok to Sell' button, the vehicle is sold to the highest bidder and the vehicle record is updated as sold in the auction system).

First, the seller can select to accept the highest bid on the vehicle (block 334). If he selects this option a message is sent to the block client application that the vehicle is sold to the highest bidder and the vehicle record is updated in the auction system as sold (block 336). Second, the seller can select to reject the highest bid on the vehicle (block 334 "no" exit also reached by selecting "reject" button). If he selects this option a message is sent to the block client application that the vehicle is not sold and the vehicle record is updates as not sold (block 346). Third, the seller can select to make a one time counter offer to the highest bidder ("Y" exit to decision block 344):

1. If the highest bidder is online, a message is sent to him asking him to accept or reject the counter offer (block 348).
   a. If he chooses to accept it, the vehicle is sold (block 354).
   b. If he rejects it, the vehicle is not sold (block 352).
2. If the highest bidder is in the lane, a message is sent to the block client to ask the in lane bidder whether or not to accept or reject the counter offer.
   a. If he accepts it, the vehicle is sold.
   b. If he rejects it, the vehicle is not sold.

Fourth, the seller can choose to 'If' the sale of the vehicle (decision block 338). This means that he is not sure whether or not to sell the car at this time.

1. If he chooses this option, the vehicle record on the auction database is marked as an 'If Sale' (block 340)

In more detail referring to FIG. 5b, if the remote seller selects the "accept" button shown in FIG. 8, then the sale is approved (FIG. 5b, decision block 334) and the item is sold (FIG. 5b, block 336). If the seller "if sales" the item (FIG. 5b, decision block 338), then the item is "if" sold (e.g., conditional on further seller approval) (FIG. 5b, block 340). If the seller wishes to propose a counteroffer (FIG. 5b, decision block 344), the seller may simply type the counteroffer amount in a box provided and click "send counteroffer." If the highest bidder is online, a message is sent to that bidder to accept or reject the counteroffer. If the highest bidder chooses to accept the counteroffer, the item is sold at the price of the counteroffer. If the highest bidder rejects the counteroffer, the item is not sold. If the highest bidder is physically present at the auction location, a message is sent to the block client 158 so the block clerk or the auctioneer can ask the physically-present bidder whether or not he is willing to accept the counteroffer. If the highest bidder accepts the counteroffer, the item is sold, if he rejects the counteroffer, the item is not sold. The outcome of any counteroffer will be displayed in the "auction log" section of the seller application in the exemplary implementation.

Figure 9:
FIGS. 9 and 9a show exemplary illustrative non-limiting screen displays showing how absentee sellers can rejoin an auction or other transaction in progress.
Figure 9A:
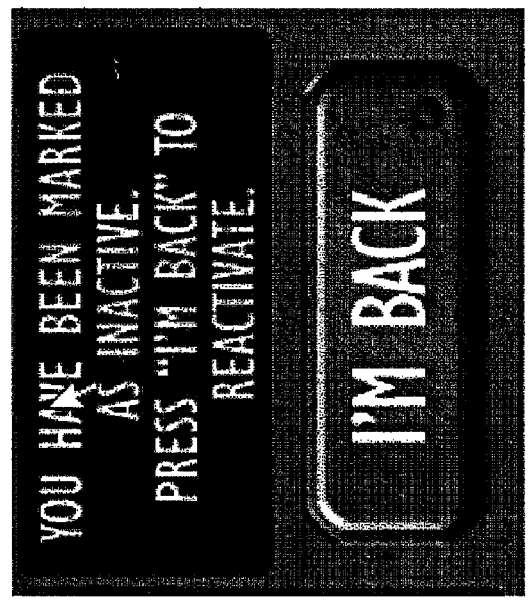

If the seller does not respond with a decision in an acceptable period of time after the bidding has stopped (FIG. 5b, block 342), the block application 158 will "if sale" the vehicle and advance the remote seller's screen display to next item—and will also mark the seller as being inactive (FIG. 5b, block 343). If the block clerk overrides the remote seller due to a failed connection or non-response, the remote seller will be prompted with a message asking him or her to take control of the sale again. FIGS. 9 and 9a show example screens that the remote seller sees when he or she has been declared to be "inactive." Simply clicking "I'm back" allows the remote seller to begin making decisions again.

Figure 10:
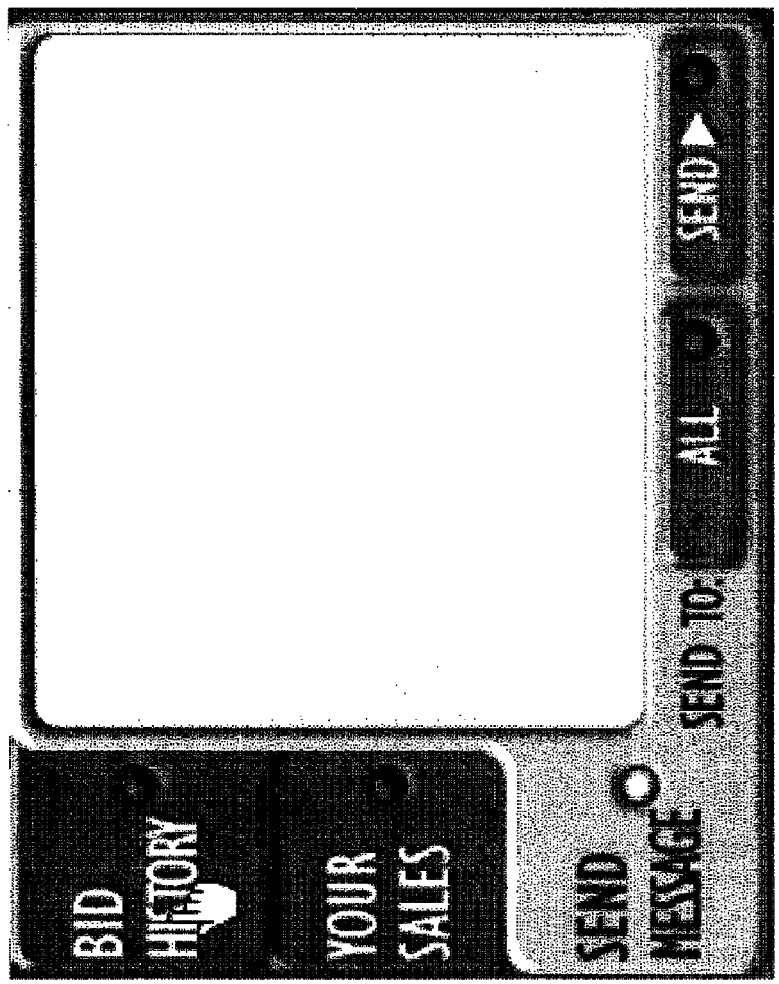
FIG. 10 shows an exemplary illustrative non-limiting messaging display screen.

FIG. 10 shows a general-purpose messaging screen remote sellers can use to send messages to other auction participants. In the example shown, messages can be sent for example either to "all" (including remote buyers on the block clerk) or to the block clerk only by clicking on the "send message" selector. The remote seller can choose the recipient by clicking on the button next to "send to". The remote seller can then type the message they wish to send in the text box and when finished click "send." This messaging facility provides for private communications of instructions and the like from the remote seller to the auctioneer 52, and also allows the remote seller to broadcast messages to all auction participants.

Example Block Client Functionality

Figure 12A:
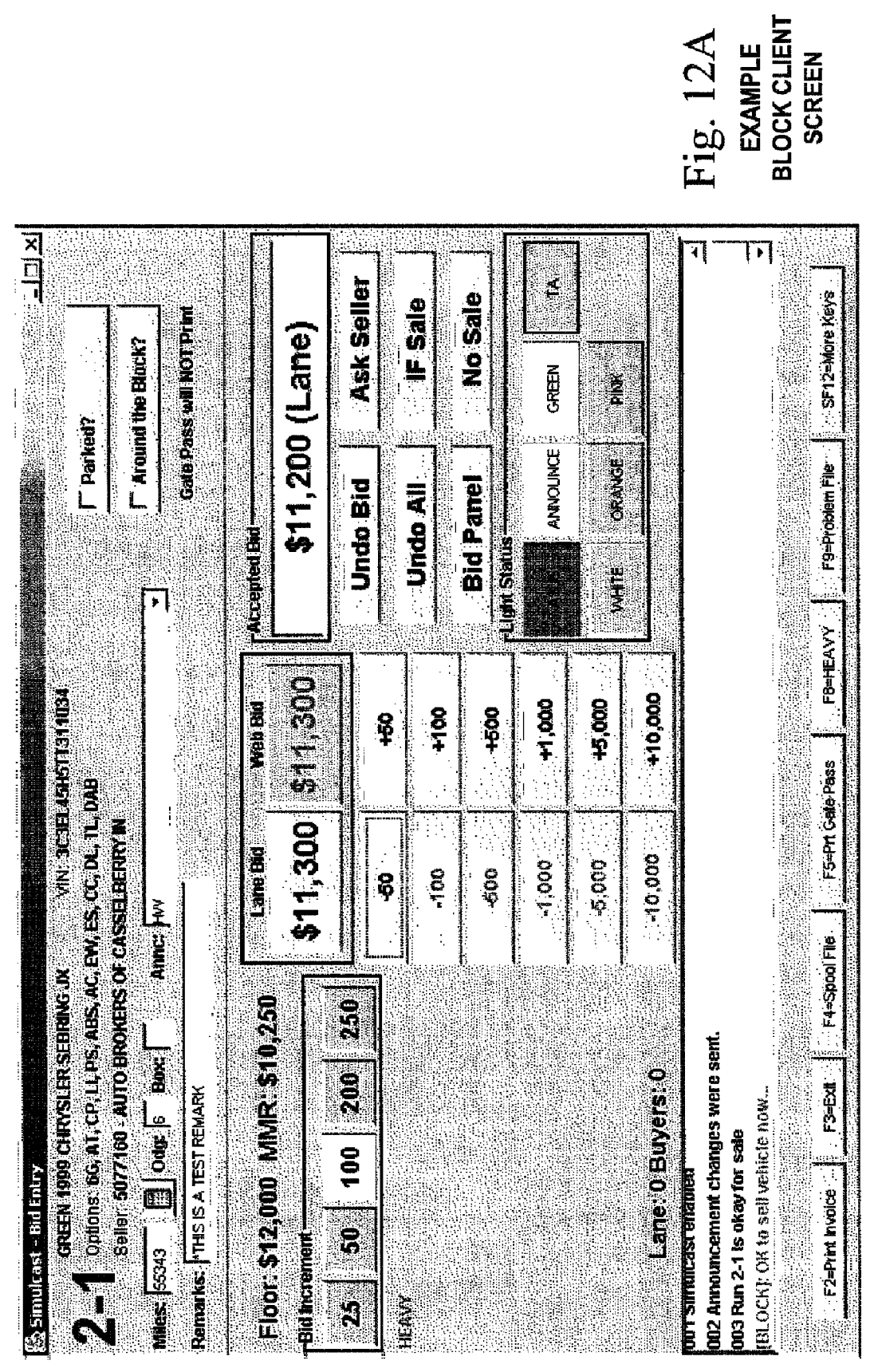
Figure 12B:
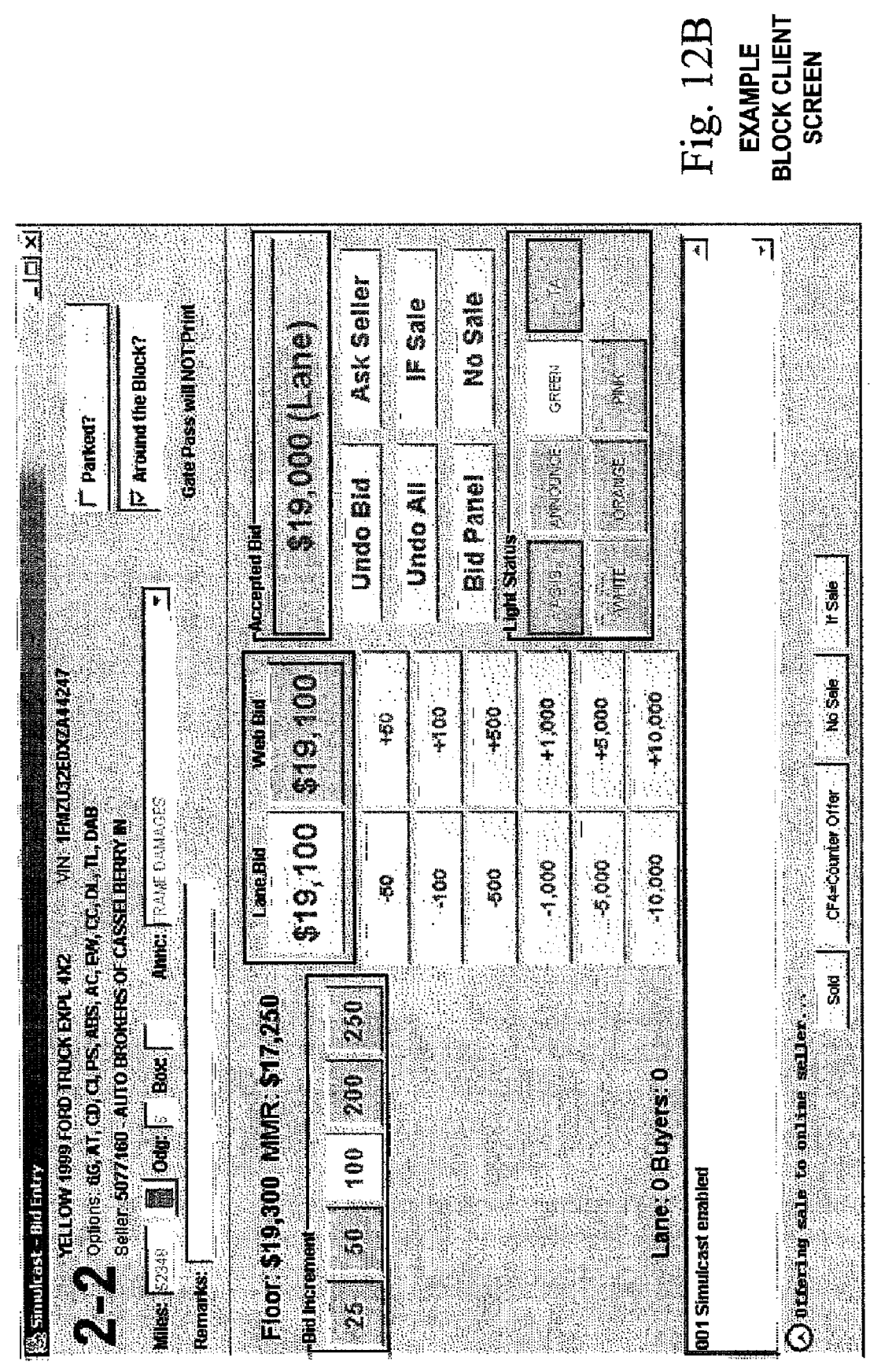
Figure 12C:
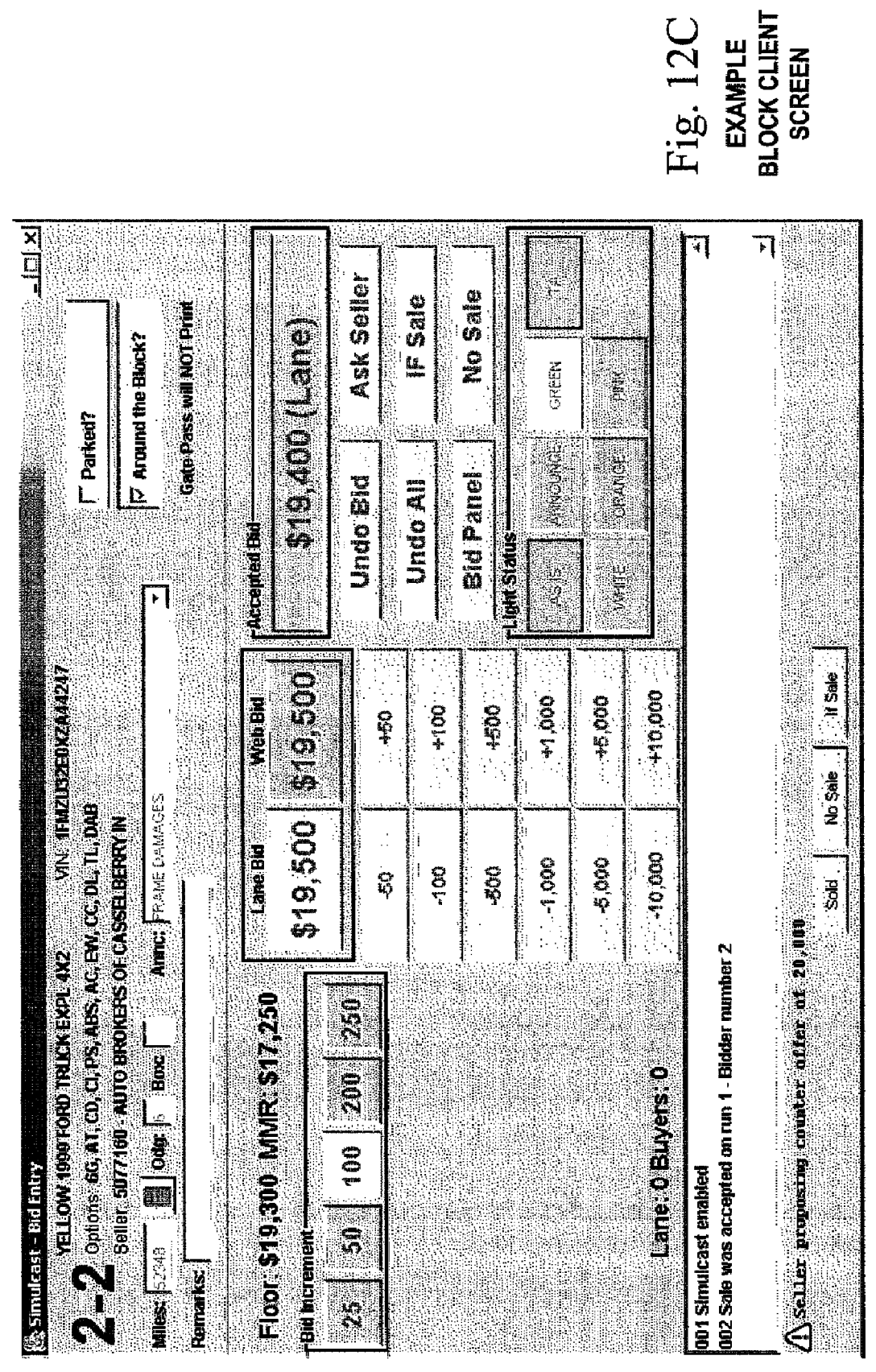

FIGS. 12a, 12b and 12c show example displays that may be displayed on the block client 158 shown in FIG. 2. As discussed above, in connection with block client functionality, the remote seller can approve a sale at any time during the auctioning of the item and the block clerk will receive an "OK to sell vehicle now" message and the "accepted bid" box shown in FIG. 12a will change color indicating the sale has been approved. If the seller does not approve the sale of the item by the conclusion of the bidding, the block client user clicks the "ask seller" button. This action prompts the seller to make a decision on the sale of the item. If the absentee does not respond in an acceptable time period, the block seller can override the seller by clicking "if sale" at the bottom of the screen. After overriding the absentee seller, the block clerk needs to "if sale" the items until the seller returns.

Referring to FIG. 12c, if the bidding has concluded and the absentee seller submits a "counteroffer" to either a physically present or online bidder, it will be displayed at the bottom of the screen. If the lane bidder accepts the counteroffer, the block clerk can simply click the "sold" button at the bottom of the screen and enter a bidder number. In the exemplary implementation, counteroffers to online high bidders are sent directly to them. If the online high bidder does not respond in an acceptable time period, the block clerk clicks "no sale" at the bottom of the screen to advance to the next item.

While the technology herein has been described in connection with exemplary illustrative non-limiting implementations, the invention is not to be limited by the disclosure. For example, while the specific arrangements above have been described in connection with the auctioning or other sale of motor vehicles, the features above can be used to help sell any kind of good or service whatsoever. Additionally, while the particular exemplary illustrative non-limiting implementation detailed above provides sales in the context of a live auction, other types of sales are also possible. For example, the features described above could be used in connection with a "virtual" auction occurring on a computer system, and a human auctioneer may or may not be present or involved. While the particular screen formats and computer architectures described above provide advantages, those particular details are exemplary, illustrative and non-limiting. While the transactions described above may advantageously use live audio/video fees for remote participants, other data communication arrangements are possible. While the exemplary illustrative implementation described above anticipates a competitive auction in which items are sold to the highest bidder, other types of auctions (e.g., reverse auctions, Dutch auctions, etc.) may be used in appropriate contexts. Still further, in other contexts it may be that no competitive bidding is used at all and that transactions are between a single and a single seller. The invention is intended to be defined by the claims and to cover all corresponding and equivalent arrangements whether or not specifically disclosed herein.

We claim:

1. A method of auctioning an item using a computer arrangement using a communications network coupling a live auction site including a block client device to plural remote computing devices each including a display and an input device, said method comprising:

employing a human auctioneer to offer an item for sale at the live auction site, said auctioneer inviting plural potential buyers to bid on said item;

receiving a high bid from one of said plural potential buyers, at least some of said plural potential buyers being co-located with said human auctioneer;

requesting a seller located remotely from said human auctioneer and participating in said auction via the communications network and a remote computing device including a display and an input device to decide on the sale of the item at the received high bid by sending, over the communications network, plural selectable options to the remote seller, said plural selectable options including at least (a) acceptance, and (b) counter-offer;

receiving a response to said request from said seller over the communications network;

if said remotely located seller has approved said sale, sending an electronic message to said human auctioneer authorizing said auctioneer to sell said item to said one of said plural buyers at said high bid; and if said remotely located seller does not accept said high bid but instead proposes a counter-offer, communicating said counter-offer to said potential buyer submitting a high bid including determining whether said potential buyer is participating in the auction online or in-person, routing said counter-offer to a remote computing device operated by said potential buyer over the communications network if said potential buyer is participating online, and routing said counter-offer to the block client device for in-person communication to said potential buyer if said potential buyer is participating in the auction in-person .

2. The method of claim 1 further including said remotely located seller selecting an additional one of said plural options indicating an "if sale" option allowing the seller to defer approval until a later time.

3. The method of claim 1 further including transmitting to said seller over said network a display format comprising a live video display of the auction site.

4. The method of claim 1 further including transmitting to said seller over said network a display format comprising an item information section providing detailed information concerning the item being offered.

5. The method of claim 1 further including transmitting to said seller over said network a display format comprising a bidding history display log that allows the remote seller to scroll back and view complete bidding history relating to the item.

6. The method of claim 1 further including transmitting to said seller over said network a display format comprising detailed pricing information relating to the item being offered including floor price or other fair market value indication.

7. The method of claim 1 further including transmitting to said seller over said network a display format comprising a messaging section allowing the remote seller to send a message to a bidder.

8. The method of claim 1 further including transmitting to said seller over said network a display format comprising a messaging section allowing the remote seller to send a message to an auctioneer.

9. The method of claim 1 further including transmitting to said seller over said network a display format comprising a messaging section allowing the remote seller to send a message to all participants of said auction.

10. The method of claim 1 further including detecting when said remote seller is no longer actively participating, and logging the remote seller as inactive.

11. The method of claim 10 further including allowing the remote seller to rejoin the auction after having been detected as inactive.

12. A method of auctioning items using a computer arrangement using a communications network coupling a live auction site including a block client device to plural remote computing devices each including a display and an input device, said method comprising:
   conducting a live auction at an auction site;
   using a human auctioneer to solicit competitive bids for an item;
   simulcasting at least the auctioneer's image and/or voice to a plurality of remote computing devices via a data communications network;
   receiving a high bid for said item from one of plural potential buyers at least some of whom are co-located with said human auctioneer;
   sending an electronic message via the communications network to a remote computing device associated with a representative of the owner of said item requesting sales approval from said representative;
   receiving a sales approval signal from one of said remote computing devices operated by a representative of the owner of said item;
   if said sales approval signal indicates said representative has approved the sale of said item to said potential buyer submitting a high bid, communicating said received approval signal to the auctioneer so the auctioneer can declare the sale as not being conditioned on seller approval and said human auctioneer is authorized to sell said item to a potential buyer submitting a high bid; and
   if said remotely located seller does not accept said winning bid but instead proposes a counter-offer, communicating said counter-offer to the potential buyer submitting the high bid including determining whether said potential buyer is participating in the auction online or in-person, routing said counter-offer to a remote computing device operated by said potential buyer over the communications network if said potential buyer is participating online, and routing said counter-offer to a block client device for in-person communication to said potential buyer if said potential buyer is participating in the auction in-person.

13. A method of selling items using a computer arrangement using a communications network coupling a live auction site including a block client device to plural remote computing devices each including a display and an input device, said method comprising:
   soliciting competitive bids from potential buyers at least some of which are present a live auction conducted by a human auctioneer, said auctioneer having access to a computing device
   receiving a high bid from a potential buyer;
   sending an electronic message to a seller who is located remotely to said auctioneer, said electronic message requesting approval of a sale based on said high bid;
   awaiting seller approval of said high bid;
   if the seller approves said high bid, notifying the auctioneer to complete a sale at said high bid;
   if the seller does not approve said high bid but counter offers instead, notifying said potential buyer of said counter offer including determining whether said potential buyer is participating in the auction online or in-person, routing said counter-offer to a remote computing device operated by said potential buyer over the communications network if said potential buyer is participating online, and routing said counter-offer to a block client device for in-person communication to said potential buyer if said potential buyer is participating in the auction in-person;
   if the seller does not respond to said electronic message within a certain time period, sending the seller's computing device a page indicating the seller has been declared "inactive"; and
   reactivating the remotely located seller upon receiving an additional signal from the remotely located seller's computing device indicating said remotely located seller is active.

14. A system for auctioning items comprising:
   an auction site at which a live auction is conducted, said auction site comprising a block client device and a human auctioneer's station allowing a human auctioneer to solicit competitive bids for an item;
   a computer network arrangement coupled to said block client device and to plural computing devices remote from said auction site, each of said plural computing devices having a display and at least one input device, said computer network arrangement simulcasting at least the auctioneer's image and/or voice to the plurality of remote computing devices over a computer network;
   a message handler coupled to said computer network arrangement, said message handler, in response to receiving a high bid for said item from one of plural potential buyers at least some of whom are co-located with said human auctioneer, sending an electronic message over the computer network arrangement to a remote computing device associated with a representative of the owner of said item requesting sales approval from said representative and receiving a sales approval signal from one of said remote computing devices operated by a representative of the owner of said item; and
   a sales approval message router coupled to said network and configured to route said received approval signal to the auctioneer if said sales approval signal indicates said representative has approved the sale of said item to said potential buyer submitting a high bid so the auctioneer can declare the sale as not being conditioned on seller approval and said human auctioneer is authorized to sell said item to a potential buyer submitting a high bid, and if said remotely located seller does not accept said winning bid but instead proposes a counter-offer, being configured to determine whether said potential buyer submitting the high bid is participating in the auction online or in-person, routes said counter-offer to a remote computing device operated by said potential buyer over the computer network if said potential buyer is participating online, and routes said counter-offer to the block client for in-person communication to said potential buyer submitting the high bid if said potential buyer is participating in the auction in-person.

15. A computer networked system for selling items comprising:

a live auction site including an auctioneer computing device including at least a display, the auctioneer computing device being structured to assist a human auctioneer in conducting a live auction and soliciting competitive bids from potential buyers at least some of which are present at the live auction;

a message handler coupled to a computer network, said message handler being programmed to, in response to the auctioneer receiving a high bid from a potential buyer, send an electronic message over the computer network to a computing device operated by a seller who is located remotely to said auctioneer, said electronic message further being programmed to request approval of a sale based on said high bid, said message handler being further structured and programmed to await seller approval of said high bid and (a) if the seller approves said high bid, notifying the auctioneer via the auctioneer computing device to complete a sale at said high bid and if the seller does not approve said high bid but counter offers instead, notifying said potential buyer of said counter offer by either routing a message to a block client at the auction site for potential buyers who are attending the auction in person or routing the message to a remote computing device associated with the potential buyer over the network if the potential buyer is participating in the auction remotely; and if the seller does not respond to said electronic message within a certain time period, the message handler being further structured and programmed to send the seller's computing device a page indicating the seller has been declared "inactive" and reactivating the remotely located seller upon receiving an additional signal from the remotely located seller's computing device indicating said remotely located seller is active.

* * * * *